United States Patent
Schwartzel et al.

(10) Patent No.: US 8,999,173 B2
(45) Date of Patent: Apr. 7, 2015

(54) AQUEOUS TREATMENT APPARATUS UTILIZING PRECURSOR MATERIALS AND ULTRASONICS TO GENERATE CUSTOMIZED OXIDATION-REDUCTION-REACTANT CHEMISTRY ENVIRONMENTS IN ELECTROCHEMICAL CELLS AND/OR SIMILAR DEVICES

(75) Inventors: David T. Schwartzel, Albuquerque, NM (US); Michael L. Fraim, Corrales, NM (US)

(73) Assignee: Global Water Holdings, LLC, Wilmington, DE (US)

( * ) Notice: Subject to any disclaimer, the term of this patent is extended or adjusted under 35 U.S.C. 154(b) by 843 days.

(21) Appl. No.: 12/663,187

(22) PCT Filed: Jun. 4, 2008

(86) PCT No.: PCT/US2008/007046
§ 371 (c)(1),
(2), (4) Date: Dec. 4, 2009

(87) PCT Pub. No.: WO2008/150541
PCT Pub. Date: Dec. 11, 2008

(65) Prior Publication Data
US 2011/0024361 A1 Feb. 3, 2011

Related U.S. Application Data

(60) Provisional application No. 60/933,228, filed on Jun. 4, 2007.

(51) Int. Cl.
C25F 1/00 (2006.01)
C02F 1/467 (2006.01)
C02F 1/32 (2006.01)
C02F 1/36 (2006.01)
C02F 1/70 (2006.01)
C02F 1/461 (2006.01)
(Continued)

(52) U.S. Cl.
CPC ............ *C02F 1/4674* (2013.01); *C02F 1/325* (2013.01); *C02F 1/36* (2013.01); *C02F 1/70* (2013.01);
(Continued)

(58) Field of Classification Search
USPC ............... 210/739, 748.01, 748.02, 143, 153, 210/198.1; 204/155, 157.15, 164, 193, 194, 204/432 R, 228.6, 290.01; 422/20, 22, 27, 422/105, 127, 128, 129, 186.04, 186.03, 422/186.22, 186.16, 186.28, 243; 205/769, 205/766, 687
See application file for complete search history.

(56) References Cited

U.S. PATENT DOCUMENTS 4,402,197 A 9/1983 Groult et al.
4,434,629 A 3/1984 Bianchi et al.
(Continued)

*Primary Examiner* — Walter D Griffin
*Assistant Examiner* — Cameron J Allen
(74) *Attorney, Agent, or Firm* — Daniel S. Polley, P.A.

(57) ABSTRACT

An electrochlorination and electrochemical system for the on-site generation and treatment of municipal water supplies and other reservoirs of water, by using a custom mixed oxidant and mixed reductant generating system for the enhanced destruction of water borne contaminants by creating custom oxidation-reduction-reactant chemistries with real time monitoring. A range of chemical precursors are provided that when acted upon in an electrochemical cell either create an enhanced oxidation, or reduction environment for the destruction or control of contaminants. Chemical agents that can be used to control standard water quality parameters such as total hardness, total alkalinity, pH, total dissolved solids, and the like are introduced via the chemical precursor injection subsystem infrequently or in real time based on sensor inputs and controller set points.

26 Claims, 14 Drawing Sheets

(51) Int. Cl.
   *C02F 101/10* (2006.01)
   *C02F 103/02* (2006.01)
   *C02F 103/42* (2006.01)

(52) U.S. Cl.
   CPC . *C02F 2001/46142* (2013.01); *C02F 2101/103* (2013.01); *C02F 2103/023* (2013.01); *C02F 2103/42* (2013.01); *C02F 2201/3227* (2013.01); *C02F 2201/46115* (2013.01); *C02F 2201/4617* (2013.01); *C02F 2201/4618* (2013.01); *C02F 2201/46185* (2013.01); *C02F 2201/4619* (2013.01)

(56) References Cited

U.S. PATENT DOCUMENTS

| | | |
|---|---|---|
| 4,481,086 A | 11/1984 | Bianchi et al. |
| 4,613,415 A | 9/1986 | Wreath |
| 4,804,478 A | 2/1989 | Tamir |
| 5,250,160 A | 10/1993 | Oksman et al. |
| 5,308,507 A * | 5/1994 | Robson .................... 210/748.19 |
| 5,362,368 A | 11/1994 | Lynn et al. |
| 5,709,799 A | 1/1998 | Engelhard |
| 5,855,856 A | 1/1999 | Karlson |
| 5,932,171 A | 8/1999 | Malchesky |
| 6,110,424 A * | 8/2000 | Maiden et al. ........... 210/748.11 |
| 6,331,279 B1 | 12/2001 | Martin |
| 6,517,713 B2 | 2/2003 | Gargas |
| 6,551,518 B2 | 4/2003 | Gargas |
| 6,780,306 B2 * | 8/2004 | Schlager et al. .............. 205/701 |
| 6,814,877 B2 | 11/2004 | Gargas |
| 7,083,733 B2 * | 8/2006 | Freydina et al. ............... 210/739 |
| 7,326,330 B2 * | 2/2008 | Herrington et al. ........... 205/769 |
| 7,374,656 B2 | 5/2008 | Elgressy |
| 2004/0060815 A1 * | 4/2004 | Buckley et al. ............ 204/230.2 |
| 2008/0067078 A1 | 3/2008 | Kitaori et al. |

* cited by examiner

AQUEOUS TREATMENT APPARATUS UTILIZING PRECURSOR MATERIALS AND ULTRASONICS TO GENERATE CUSTOMIZED OXIDATION-REDUCTION-REACTANT CHEMISTRY ENVIRONMENTS IN ELECTROCHEMICAL CELLS AND/OR SIMILAR DEVICES

CROSS-REFERENCE TO RELATED APPLICATIONS

This application claims priority to and the benefit of the filing of PCT application Serial No. PCT/US2008/007046 filed on 4 Jun. 2008, which in turn claims priority of U.S. Provisional Patent Application Ser. No. 60/933,228, entitled "AQUEOUS TREATMENT APPARATUS UTILIZING PRECURSOR MATERIALS AND ULTRASONICS TO GENERATE CUSTOMIZED OXIDATION-REDUCTION-REACTANT CHEMISTRY ENVIRONMENTS IN ELECTROCHEMICAL CELLS AND/OR SIMILAR DEVICES," filed on Jun. 4, 2007, and the specification thereof is incorporated herein by reference.

FIELD OF THE INVENTION

The present invention relates to the real-time modification and control of the electrochemical production of a customized blend of mixed oxidants, reactants or reductants using various prepackaged, or bulk precursor chemical compounds: liquids, gases, solids to generate a unique and customized oxidizing, precipitating, reducing or reactant chemistry environment both in the electrochemical cell itself and/or electrolytic device, and downstream of the cell/device in an adjacent cell/device, or in the water volume passing through the cell/device, or water reservoir to be treated, in both quantity and concentration greater than that which could be produced via current industry electrochemical/electrolytic processes and practice.

BACKGROUND OF THE INVENTION

The following references disclose use of electrochemical cells:
U.S. Pat. No. 5,932,171
U.S. Pat. No. 4,481,086
U.S. Pat. No. 4,434,629
U.S. Pat. No. 4,493,760
U.S. Pat. No. 4,402,197
U.S. Pat. No. 5,250,160
U.S. Pat. No. 5,534,120
U.S. Pat. No. 5,865,966
U.S. Pat. No. 5,947,135
U.S. Pat. No. 6,814,877 B2
JP Application No. 10057297A
JP Application No. 10179489A
JP Application No. 0074975 A1
JP Application No. 0023227 A1
JP Application No. 10033448A
JP Patent No. 09122060
JP Patent No. 2000116587
JP Patent No. 10178491
EP Application No. 0983806A1

Electrochemical cells for use in water/wastewater treatment systems are designed to operate by making use of the water electrolysis process wherein, at the anode-water interface, OH—; being present in water due to electrolytic dissociation of water molecules donates an electron to the anode and can be thereby oxidized to oxygen gas which can be removed from the system. As a result, the H+ concentration can be enhanced at the anode-water interface so that H+ enriched acidic water can be produced. In a similar manner, at the cathode-water interface, H+ accepts an electron from the cathode and can be reduced to hydrogen to form hydrogen gas which can be similarly eliminated from the system so that the OH—; concentration can be increased at the cathode-water interface whereby OH—; enriched alkaline water can be generated. Further, when a halogen-containing water (such as, natural water containing sodium chloride or an aqueous solution of sodium chloride) is subjected to electrolysis, halogenated mixed oxidants are generated in the electrolyzed water. This process can be further enhanced by adding selective precursor chemical substances in liquid, gas or solid phase upstream of the electrolytic cell so that upon entering the electrolytic cell they are dissociated or re-combined into tailored amounts of specific oxidants, reductants, or reactants. Ultrasonic treatment when used in conjunction with electrochemical cells can enhance the production of hydroxyl radicals and other oxidants, can keep the cell electrodes free of carbonate, sulfate, sulfide and iron oxide deposits, create a more thorough mixing in the electrochemical volume being treated, reduce the ion boundary layer thickness on each electrode, and either create micro- or nano-bubbles for increased surface area and longer life, or to agglomerate bubbles to enhance flow within the cell. On large water treatment processes electrochemical cells are usually used to treat a side stream of the main flow which is then recombined with the main flow to effect the desired water treatment, or on reduced flow systems the full flow can be directed through the electrochemical cell(s) for treatment.

Water quality can be defined by measuring the concentrations of oxidants, total hardness, total dissolved solids, total dissolved organics, chemical oxygen demand (COD) biological oxygen demand (BOD), specific contaminants such as heavy metals, pharmaceuticals and/or pathogens, industrial compounds, hormones and other endocrine compounds, dissolved oxygen, conductivity, oxidation-reduction potential (ORP), streaming current potential, and turbidity of the water.

Drinking water supplies are commonly disinfected with an oxidizer like chlorine. However the organics in the raw water mix with the chlorine used for disinfection to create cancer-causing agents like trihalomethanes (THMs) and haloacetic acids (HAAs). Drinking water and wastewater treatment plants may use on-site electrolytic generators to produce the chlorine used for disinfection and/or ultraviolet light for disinfection and/or as part of an advanced oxidation system for targeted organics destruction. By minimizing the organic content of the water it is possible to reduce the THM/HAA production and create a better quality water supply. Swimming pools, spas, water features such as ornamental fountains and the like are commonly sanitized using either electrolytic chlorination with/without an ultraviolet light clarifier, or ozonation. Each of these technologies has its own distinct advantages and disadvantages.

Conventional apparatus used to sanitize water in pools and the like, includes electrolytic chlorination systems, or "salt" chlorination systems. These systems utilize an electrolytic cell or "Chlor-alkali" cell, typically comprising a submerged positively charged anode, a negatively charged cathode, and an electrical energy source for applying a current across the gap between the anode and cathode. The anode compartment contains an anolyte including a source of chlorides which, when oxidized, forms chlorine gas. Typically, the chloride source comprises an alkali metal chloride salt such as sodium chloride or potassium chloride, although other sources, such as hydrochloric acid and the like may also be used.

When current is applied across the anode and cathode gap, the sodium and chloride ions disassociate with chloride ion concentrating in the anolyte solution and the sodium ion concentrating in the catholyte solution. Chlorine and/or oxygen gas is generated on the anode surface and hydrogen gas is generated on the cathode surface which is released back into the flowing water. The dissolved chlorine gas reacts with the water to create hydrochloric acid (HCl) and hypochlorous acid (HOCl). When either ozone or hydrogen peroxide are added as precursor compounds the electrochemical cell, or electrolytic device will produce small amounts of chlorine dioxide in addition to chlorine and other mixed oxidants. At concentrations greater than 1 ppm, hypochlorous acid minimizes or prevents the growth of algae, bacteria, and other microorganisms. When an electrolytic cell is used, the sodium hydroxide and hypochlorous acid recombine to form sodium hypochlorite (bleach) which is the active oxidizer transported back into the main body of water to prevent microorganism growth. Typical examples of salt chlorination systems are disclosed in Kosarek, U.S. Pat. No. 4,361,471, Wreath, et al., U.S. Pat. No. 4,613,415, and Lynn, et al., U.S. Pat. No. 5,362,368, the entire disclosures of which are incorporated herein by this reference.

One shortcoming of the electrolytic cell is that calcium carbonate or sulfate scale and bio-film build up on the cathode side of the mono- or bi-polar cells with time. The carbonate ion is created from the oxidation of organic matter with the chlorine sanitizer and it combines with the calcium ion in the water to make calcium carbonate salt. Elemental iron in the water is oxidized to iron oxide which coats the electrode surface and provides sites for the hardness scale to attach itself to the electrode. Current electrolytic cell technology reverses the polarity to switch the anode and cathode surfaces on the bipolar plate to dissolve the calcium carbonate scale build up on the alternate side of the plate. Large scale pieces and organic material build up in the electrode pack and usually need to be removed with acid cleaning or via the addition of surfactants.

Another shortcoming of the electrolytic cell is that it produces a constant chemistry in the cell and so if the water quality changes in the body of water being treated, such as increased bather load, or a slug of organic material enters the water volume (and the ORP changes), then the sanitizer chemistry may be overcome leading to an unsafe condition for human health either temporarily, or for an extended period of time until the sanitizer chemistry catches up with the demand.

Another shortcoming of the electrolytic cell is that it produces a constant chemistry in the cell that is independent of the type of water being treated and the particular contaminants in that water. For example, the water treatment chemistry required via electrolytic generation for a pool, is very different from the treatment required for remediation of contaminated groundwaters. In each of these cases, additional compounds are added manually to effect the desired treatment. Eg. in a pool environment, superchlorination with monopersulphate is required to destroy chloramines.

Another maintenance problem with electrolytic chlorination systems is that they are not particularly effective on algae reduction and so the addition of algaecides and the like must be included in the maintenance routine for pool operators. This is usually a temporary condition and the algae problem goes away upon treatment.

Another shortcoming of electrolytic chlorination systems is that amines, such as ammonia, tend to build up in the water over time, binding with the chloride to form chloramines. Since chloramines have strong odors, can irritate the skin and eyes of bathers, are toxic to ingest, cause discoloration and fading of human hair and bathing suits, it is recommended that pool and spa owners periodically superchlorinate or "shock" the water by adding high amounts of chlorine. The increased chlorine breaks down the chloramines by oxidizing the amines to nitrogen gas. Unfortunately, the amount of chlorine required for superchlorination is higher than the safe concentration for swimming or bathing, thus rendering the pool unusable for an extended period.

Another recommended option for removing chloramines, bacteria, viruses and protozoa from commercial pools and the like is to install an ultraviolet (UV) lamp disinfection system upstream of the electrolytic chlorination system. The UV disinfection system uses low-pressure, high-output mercury lamps or medium-pressure mercury lamps contained in individual quartz sleeve to treat the saltwater flowing through the cell. The UV radiation from the lamp(s) decomposes the chloramines into hydrochloric acid and nitrogen gas. The UV radiation inactivates the microbial DNA of bacteria and algae which makes the microbes more susceptible to chlorination. The UV disinfection system is a relatively high maintenance item, because the quartz sleeve(s) have to be cleaned regularly to prevent particulate build up on the sleeve which would block the UV radiation. Currently, a mechanical-chemical wiper system is used to remove soft scale from the quartz sleeve.

Conventional apparatus for sanitizing water using ozonation typically comprises a high efficiency ozone generator and a venturi mixer or inductor port that injects ozone gas into the water to oxidize contaminants in the water. Exemplary ozonation systems which have been found to be particularly effective in pools and spas are disclosed in Martin et al, U.S. Pat. No. 6,500,332, Martin et al, U.S. Pat. No. 6,129,850, Martin et al U.S. Pat. No. 6,372,148, and Martin, U.S. Pat. No. 6,331,279. Other ozonation systems are disclosed in Karlson, U.S. Pat. No. 5,855,856, Morehead U.S. Pat. No. 5,451,318, Engelhard, U.S. Pat. No. 5,709,799, and Karlson et al., U.S. Pat. No. 5,518,698. The entire disclosure of each of these patents is incorporated herein by this reference.

Ozone has been recognized by the FDA to be more than 200 times stronger than chlorine in microbial kill, and can react at higher oxidation levels than can be achieved safely with chlorine. However, dissolved ozone can exist in water for only a very short period before it reacts and is converted back into oxygen gas. Thus, dissolved ozone is not an effective residual sanitizer, in contrast to chlorine which has relatively steady and consistent residual sanitation properties.

To overcome the short residence time of ozone and the high vapor pressure of chlorine in hot spa water, spa and pool owners have added at sodium bromide salt to the water. Bromine has a very low vapor pressure compared to chlorine, thus, it does not vaporize as readily in aerated hot spa water. Dissolved ozone or sodium hypochlorite will react with the bromide ion to create the hypobromite ion in the water. Hypobromous acid or sodium hypobromite salt will oxidize ammonia to nitrogen gas without creating an intermediate amine compound like the chlorine oxidizer.

Attempts to combine the favorable properties of chlorination and ozonation are described in Tamir, U.S. Pat. No. 4,804,478 and Gargas, U.S. Pat. Nos. 6,517,713, 6,551,518 and 6,814,877 B2. The entire disclosure of each of these patents are incorporated herein by this reference.

In the evolution of water treatment it has been identified that organics in the water are undesirable and lead to the formation of carcinogenic compounds when chemically reacted with sanitizers, and disinfecting agents like chlorine, bromine and ozone. For this reason it is desirable to reduce as much as possible the concentrations of organic compounds in the water. For this reason, advanced oxidation processes have been developed to destroy the organic compounds before they can react with the sanitizing/disinfecting agents. Advanced oxidation processes (AOPs) are defined as those processes that optimize the production of hydroxyl radicals (OH) and oxygen species without the addition of metal catalysts. In water treatment, AOPs refer specifically to processes where oxidation of organics by hydroxyl radicals (OH—) occurs specifically through processes that involve ozone ($O_3$), hydrogen peroxide ($H_2O_2$) and/or ultraviolet light (UV with $\lambda$<300 nm), Fenton oxidation, and sonolysis. All AOP systems generate OH radicals via a pressure (cavitation), chemical reaction, electric field, or photon-based process, or combinations thereof. The ability of an oxidant to initiate chemical reactions is measured in terms of its oxidation potential. The end product of complete oxidation (mineralization) of organic compounds is carbon dioxide ($CO_2$) and water ($H_2O$). The oxidation potential of OH radicals at 2.8V is high relative to ozone at 2.1V and chlorine at 1.4V.

Depending on the existing oxidants in the water and whether salts, anions, ozone and/or air are added to the water a number of other oxidizers may be generated under AOP conditions including: ozone, peroxomonosulfuric acid, peroxodisulfuric acid, sodium peroxycarbonate, peroxodiphosphate and hydrogen peroxide, all good disinfectants and oxidizers. In general these peroxides can also kill microorganisms, however these peroxides are very unstable. Perborates are very toxic and peracetic acid (PAA) is a strong acid. PAA can be aggressive in its pure form. Stabilized persulphates can be used to replace chlorine to meet "chlorine-free" disinfection requirements as can electrolyzed water processes.

AOP systems are designed to treat a wide range of common water pollution problems, for example: total organic carbon (TOC) removal in high purity water systems such as pharmaceutical and semiconductor manufacturing, N-Nitrosodimethylamine (NDMA), a contaminant found in groundwater from liquid rocket fuel production or as by-product of rubber processing, other groundwater pollutants such as Methyl-tert-butyl ether (MTBE), trichlorethylene (TCE), acetone, phenols, benzene, toluene, and xylene. Pesticide removal such as atrazine and 1,4-dioxane from surface or groundwater supplies and bromate removal caused by ozonation of water containing bromide ion are other AOP processes. Dechlorination and dechloramination of process water is another AOP process.

Conventional AOP technologies are fairly well understood and straightforward to design and implement. Some of the newer AOP technologies such as: $TiO_2$ catalyzed UV oxidation, electro-hydraulic cavitation, electrochemical oxidation, UV/electrochemical oxidation and streaming current electric discharge (SCED) have the potential to deliver greater efficiencies and better performance than conventional treatment processes with the caveat that each contaminant cocktail is different and must be evaluated for the most appropriate treatment alternative.

In the AOP system the chemical reactions are highly accelerated oxidation reactions that occur when the OH radicals react with organic pollutants to initiate a series of oxidative degradation reactions. However, OH radical inevitably reacts with all kinds of organic and inorganic constituents in water which result in decreasing the efficiency of OH radical for degrading the pollutant of interest. Dissolved iron oxidation uses the OH radical before the oxidation of organics. It is also known that high alkalinity reduces the OH concentration preferentially to generate the carbonate ion. Therefore, the biggest issue of AOP process lies in increasing the OH production yield and directing the reaction pathway where major reactions between OH radical and the pollutants occur.

There still exists a need for an electrolytic water treatment system that can operate as a combined advanced oxidation process—residual oxidant generator for treatment of a wide range of water qualities and uses. There exists the need to be able to generate a unique oxidant mix (or reductant, or reactant mix) via the addition of precursor compounds and materials upstream of the electrolytic cell such that the resulting electrolytic chemistry contains sufficient numbers of particular and varied oxidizing/reducing species as is necessary to effectively treat the water contaminants. Furthermore there is a need for the addition of precursor chemicals and materials to optimize the electrochemical output of the cells with products that are more useful to the particular water treatment application. Furthermore, there exists a need for such systems which can be manufactured simply and inexpensively, which can easily fit or be retrofitted into a conventional drinking water plant, swimming pool, spa, cooling tower, water feature or the like, and which requires relatively little maintenance.

There still exists a need for an electrolytic water treatment system that can operate as a combined advanced oxidation process—residual oxidant generator for treatment of a wide range of water qualities that uses an ultraviolet lamp(s) as a virtual anode(s) in an electrolytic cell and a separate wire(s), or a surface of the cell, as the cathode(s). There exists the need to be able to generate a unique oxidant mix, or reductant mix, or reactant mix via the addition of precursor compounds or materials upstream of the UV— electrolytic cell such that the resulting electrolytic chemistry contains sufficient numbers of particular and varied oxidizing/reducing species as is necessary to effectively treat the water contaminants in real time and under changing, generally degrading, water quality conditions. Furthermore, there exists a need for such systems which can be manufactured simply and inexpensively, which can easily fit or be retrofitted into a conventional drinking water plant, industrial treatment plant, swimming pool, spa, cooling tower, irrigation channel, mining process, water feature or the like, and which requires relatively little maintenance.

There still exists a need for an on-site electrolytic/electrochemical based mixed oxidant and/or sodium hypochlorite generator using only salt, water, electricity and custom prepackaged, or bulk precursor compounds to create custom liquid admixtures for municipal water treatment, industrial water treatment, oil & gas produced water remediation, solution mining, mine wastewater cleanup, cyanide destruction, acid mine drainage cleanup, or like applications. The mining industry currently uses bulk solutions of sodium hypochlorite for solution mining having a single pH value. The flexibility and enhanced process performance afforded the solution mining operation and/or mine wastewater remediation operation with the present invention is significant due to the varied pH and electrolytic chemistries that can be produced at will.

SUMMARY OF THE INVENTION

The present invention relates to water/wastewater treatment systems and, more particularly, to systems and methods for maintaining the water quality of drinking water supplies, swimming pools, ponds, irrigation waters, aquatic mammal tanks, spas, fountains, cooling towers and the like, and for the destruction of targeted contaminants in wastewater streams such as from municipal wastewater treatment plants, groundwater remediation streams, industrial wastewaters and larger bodies of water such as streams and rivers and for the preparation of lixiviant solutions suitable for solution mining applications.

The present invention comprises an apparatus for generating a customized and potentially real-time varied mixed oxidant stream that contains oxidants such as: ozone, hydrogen peroxide and other peroxygen species, hydroxyl radicals, as well as chlorine based oxidants, the quantities and concentrations of each which are determined by the amount and type of precursor compounds that are fed into the electrolytic cell(s). The purpose of the precursor compound feed(s) are to generate both an advanced oxidation process within the pulsed DC-driven electrochemical cell(s) and downstream of the cell(s) in the water reservoir to be treated, and a residual oxidant both in the electrochemical cell and in the water reservoir to be treated, for longer term sanitizing and oxidation of organics. The precursor compound feed stocks are housed in prepackaged cartridges on a carousel type device or the like, or housed in an integrated apparatus housing and may include liquids, dissolvable solids, or compressed gases, or combinations thereof. For all water treatment systems but in particular the larger volume treatment processes there may be a requirement for direct or indirect chemical precursor injection of bulk liquids, gases or dissolvable solids into the electrolytic cell(s).

The present invention comprises an apparatus for generating a customized and potentially real-time varied mixed reductant stream that contains reductants such as: ammonia, carbon monoxide, or hydrogen sulfide gases, atomic hydrogen or nitrogen, or sulfide salts, the quantities of each which are determined by the amount and type of precursor compounds that are fed into the electrolytic cell(s). The purpose of the precursor chemical feed(s) is to create a customized reducing environment for effective treatment of specific contaminants that are not destroyed in an oxidation process such as precipitation of heavy metals with the addition of sodium bisulfide. The precursor chemical and material feed stocks are housed in cartridges on a carousel, or integrated apparatus housing and may include liquids, dissolvable solids, or compressed gases, or combinations thereof fed upstream of the electrolytic cell via an injector device, like a mazzei injector. For larger water treatment systems there may be a requirement for bulk supply of precursor agents to the injector system or bulk direct chemical precursor injection of liquids, gases or dissolvable solids into the electrolytic cell(s).

The present invention comprises an apparatus for generating a customized water chemistry via the addition of precursor compounds that are changed through electrochemical processes into different chemical agents and/or other chemical precursors that are not affected by electrochemical processes that can also be used to control typical water parameters such as: calcium hardness, total alkalinity, pH, total dissolved solids, and the like infrequently, or in real time based on sensor inputs and controller set points. Chemical precursors to moderate these water quality parameters can be introduced into the treatment apparatus in the form of replaceable cartridges, replaceable bottles, solid blocks, line feeds or other such like chemical and material inputs.

The present invention comprises an apparatus that may/may not use ultrasonic emitters in the KHz and/or MHz ranges attached to the electrolytic cell, or series of cells, or different ultrasonic transmitters placed sequentially along the sides of a single electrolytic cell, or a single ultrasonic emitter operating in a sweep frequency mode, to facilitate a thorough mixing of the cell contents for better chemical reaction kinetics, for improved boundary layer circulation at the surfaces of the electrodes, for enhanced OH radical production, for scale removal from the electrodes, for degassing of the electrolytic cell, for bubble agglomeration in the cell, for cavitation of the waters and for micro- and nanobubble formation for enhanced surface area generation and enhanced reaction kinetics. The present invention comprises an apparatus that can utilize UV lamps operated as virtual anodes to create an electrolytic device, or electrochemical cell and so then to use the UV light to both disinfect the water and be used in as advanced oxidation process via direct and indirect photolysis and indirectly via operating as an electrochemical cell.

The present invention comprises an apparatus for generating a customized mixed oxidant chemistry via addition of precursor compounds that can be optimized both infrequently, via manual intervention, to treat seasonal water quality fluctuations, or that can be adjusted in real-time to account for daily, hourly or more frequent fluctuations in water quality. This capability is of particular usefulness for municipal water treatment plants where on-site electrolytic hypochlorite generation or electrolytic mixed-oxidant generation for disinfection is practiced. These on-site generators both of which create a uniform 0.8%, or 0.4% disinfection chemistry respectively, are not flexible with respect to oxidant generation since they use a near saturated brine injection into the electrolytic cell(s) as the only feed stock and hence the resulting oxidant quantity and concentration is fixed.

The present invention comprises an apparatus that can employ any number or combination of types of electrodes in an electrochemical cell(s) such as, but not limited to: dimensionally-stable electrodes, boron-doped diamond electrodes, titanium-ceramic—Ebonex® electrodes, carbon—glassy, or aerogel electrodes, lead-oxide electrodes, titanium, nickel, platinum, copper—electrodes with specialty coatings, expendable electrodes such as iron or aluminum for electrocoagulation, or silica-based electrodes. The choice of electrode to be used in the present invention depends upon a large number of variables such as, but not limited to: the water treatment process(es) selected, the contaminants of interest, the influent water quality, the desired water quality, the efficiencies of the treatment processes and costs associated with the treatment process.

The present invention comprises an apparatus that integrates boron-doped diamond electrodes specifically used for in-situ ozone production in water as the precursor chemical for advanced oxidation processes in electrochemical cells.

The present invention comprises an apparatus that integrates boron-doped diamond electrodes specifically for in-situ production of mixed oxidants from the water itself that is fed to an electrochemical cell(s).

The present invention comprises an apparatus that integrates boron-doped diamond electrodes specifically for the in-situ enhanced production of mixed-oxidants in water as determined by the selection of precursor compounds feed to the electrochemical cell(s).

The present invention comprises an apparatus that can employ any number of different types and combinations of precursor compounds in solid, liquid or gas phase depending upon the water treatment process(es) selected, the contaminants to be treated, the existing water quality, the desired water quality, and other variables.

The present invention comprises an apparatus that integrates these different types and combinations of precursor compounds, and materials as solid, liquid or gas phase feed stocks into the treatment apparatus in the form of replaceable cartridges, replaceable bottles, solid blocks, line feeds or other such like chemical inputs and for larger water flows bulk supply of the various feed stocks and precursor feed materials.

The present invention comprises an apparatus that integrates precursor compounds that may comprise halogen salts—flourine, chlorine, bromine, iodine, sulphate salts—sodium or potassium or the like introduced as solids, or dissolved in water, or other solvent.

The present invention comprises an apparatus that integrates precursor compounds that may comprise liquid feed stocks—ozone, hydrogen peroxide, peroxyacids, brine solutions, chlorine solutions, ammonia solutions, amines, aldehydes, keytones, methanols, chelating agents, dispersing agents, nitrides, nitrates, sulfides, sulfates, and the like, dissolved in water, or other solvent.

The present invention comprises an apparatus that integrates precursor compounds that may comprise gaseous feed stocks—ozone, air, chlorine dioxide, oxygen, carbon dioxide, carbon monoxide, argon, krypton, bromine, iodine and the like. Bulk gaseous feeds may be direct to the injector, direct into the electrolytic/electrochemical cell itself, or to the injector system, or electrolytic cells directly via compressed gas cartridges in the chemical precursor carousel.

The present invention comprises an apparatus that may use a semi-permeable membrane such as Nafion® or resin impregnated plastic to separate the anode flows from the cathode flows in the electrochemical cell(s). An anionic or cationic membrane can be used to provide one-way transport of ions across the membrane. The membrane can be used to create an acidic or basic solution for downstream water treatment processes by driving a pressure drop across the membrane.

The present invention comprises an apparatus that uses ultraviolet (UV) lamps operating as virtual anodes in an electrochemical cell. UV lamps may also include a boron-doped diamond coating and so operate as virtual anodes in an electrochemical/electrolytic cell. Conventional UV mercury lamps can be used to oxidize elemental mercury to mercury oxide for removal as a solid precipitate.

The present invention comprises an apparatus that determines the ratio and quantities of precursor compounds to be measured into the electrochemical cell via sensor input(s) and real time monitoring if required, of the various water quality parameters of interest, and the oxidant concentrations of interest either in the electrolytic cell, or in the treated volume of water.

Accordingly, new customized water treatment apparatus and methods are provided by the present invention. The apparatus is highly effective in destroying organics, select contaminants, bacteria, viruses, protozoa and providing a residual oxidant in the water in a drinking water system, irrigation water, industrial water, pool, spa, fountain, cooling tower, or other reservoir of water and while making the water comfortable and safe for its intended purposes.

Accordingly, new customized water treatment apparatus and methods are provided by the present invention. The apparatus is more effective than chlorine alone in destroying recreational water disease agents such as cryptosporidium and giardia.

Accordingly, new customized water treatment apparatus and methods are provided by the present invention. The apparatus is highly effective in destroying organic chloramines in a pool environment without the need for superchlorination.

In one aspect of the invention, water treatment apparatus are provided which generally comprise an inlet line adapted to receive a flow of water to be treated, and an injector assembly, for example a venturi injector, connected to the inlet line and structured and adapted to combine the flow of water with a precursor chemical agent, or agents, for example, liquid hydrogen peroxide and/or an in-situ generated ozone containing water. The injected water having a level of precursor compounds relative to the stream of first water to be treated, is then passed, preferably directly passed, to an electrolytic device, which may include monopolar, membrane or bipolar cell(s) positioned in contact with the flow of water to be treated. The precursor compounds and existing precursor agents in the flow of first water to be treated (sulphates, chlorides, ammonia, for example) react in the electrochemical cell to create a second water, for example water containing a halogen-containing component, such as chlorine, a chlorine-containing component, bromine, a bromine-containing component and the like, ozone, other oxidants, and the like and mixtures thereof. The use of ultrasonic emitters attached to the electrochemical cells results in an enhanced advanced oxidation environment via the production of additional hydroxyl radicals and other oxidants via sonolysis.

Although the electrochemical cell is sometimes hereinafter referred to as an "electrolytic cell", or "electrolytic device", it should be appreciated that the present invention is not intended to be limited to a conventional electrolytic chlorinator but may be any suitable electrolytic device useful for the purposes and objects of the invention described elsewhere herein. It is preferable in many cases, but it is not necessary that the water stream in the inlet line include a salt, such as a halide salt, for example, an alkali metal halide salt, such as sodium chloride, sodium sulfate, sodium bromide and the like and mixtures thereof as the oxidants of interest for water treatment may not include chlorine substances for instances where a "chlorine-free" swimming pool is desirable. The use of certain electrode types such as boron-doped diamond electrodes often will not need halide salt addition in the inlet stream as they can utilize low concentrations of dissolved salts in the water stream itself to generate chlorine disinfectants and the like.

An outlet line may be provided which is adapted to pass the second water from the electrolytic device to an application for use, for example to a drinking water reservoir, or tank, to a pool, such as a swimming pool and the like, spa, hot tub, fountain, cooling tower, other reservoir and the like. A recirculation line from an agricultural or industrial waste water ponds or irrigation tanks, would pass through the electrolytic device to remove odorous or hardness compounds such as hydrogen sulfide, mercaptans, calcium carbonate, calcium sulphate or organic matter left over from processing. By removing the organic matter from the water, the irrigation water does not spread black leaf mold or provide a breading bed for harmful bacteria to the plant's root system or to animals foraging on the grass or alfalfa. The present invention can be used on irrigation water to prevent the accumulation of hardness in the root zone by removing the water hardness precipitants prior to irrigation. Precipitations of hardness compounds in the root zone inhibit percolation of water and nutrients to the plants and therefore reduce growth and yield. With higher anode currents bicarbonate ions can be removed from irrigation water as carbon dioxide gas. Reducing the alkalinity in the irrigation water prevents the calcium carbonate build up in the soil. In the extreme, the buildup of salt and hardness compounds will destroy the ability to grow agricultural products. By electrolytically reducing hardness it reduces the hardness build up on sprinkler nozzles. The present invention can be used to dechlorinate water and/or wastewater for agricultural or reuse purposes. The present invention using a membrane cell can be used to destroy organic compounds, or disinfect the water on the anode side.

Then the anolyte is recycled on the cathode side and injected with a precursor sulphur dioxide to dechlorinate and to restore the reducing state to generate a chlorine-free irrigation water.

The apparatus are preferably structured to be easily installed into an existing circulation system for the reservoir. Water may be cycled through the apparatus by means of a pump mechanism, located, for example, upstream of the precursor injector.

In a preferred embodiment, an ozone generator is provided and is coupled to the injector to be effective to introduce, for example, inject, an ozone containing water, or gas into the stream of water such that the first water comprises a first ozonated water and the second water comprises a second ozonated water that passes through the electrochemical cell.

Preferably, the apparatus further include a control system effective to regulate a quality or property of the water passing through the apparatus. For example, the control system may include one or more sensors and a control unit, for example a microprocessor based control unit, configured to respond to an input signal from the one or more sensors, for example, electronic sensors, and to regulate power output to the electrochemical cell(s), the electrochemical or corona discharge ozone generator, the precursor dispenser solenoids and/or pump in order to maintain or adjust the quality, properties and oxidant/reductant/reactant content of the first or second water, for example, water being passed out of the apparatus and into the reservoir. The microprocessor control prevents wasting energy and matches electrochemical product concentrations for varying treatment loads.

In some embodiments of the invention, two or more of the components of the system are contained in a common housing. For example, in some embodiments, the ozone generator, precursor cartridges, and the power supply for the electrochemical cell(s), or the ozone generator, the precursor cartridges and the electrochemical cell(s) with or without the power supply are contained within a common housing. In other embodiments, the injector assembly and the electrolytic device are contained within a common housing. In a particularly advantageous embodiment, the injector assembly and the electrolytic device are located so as to treat or process water in a main water line of an existing circulation system for the reservoir or the like. In another preferred embodiment the precursor chemical cartridges, an electrolytic boron-doped diamond electrode ozone generator, the injector and electrochemical cell(s) are integrated into a single flow-through system with quick disconnect couplings at both ends to facilitate easy installation on a straight run of pipe.

In more specific aspects of the invention, the control system may comprise a flow sensor for detecting flow and shutting off power to one or more of the components of the system in the event that a low flow threshold is detected by the sensor. The control system also prevents the destruction of the electrodes under low flow conditions via either a low flow sensor, and/or high thermal cutoff sensor.

In some embodiments, the control system includes a pH controller configured to maintain both a desired pH level in the first water and/or a desired pH level in the second water. Advantageously, the apparatus may be structured such that the pH of the water passing to the electrolytic device is sufficiently acidic to provide an acid wash, for example, a substantially continuous acid wash, or at least a partially continuous acid wash, to the electrolytic device. For example, in some embodiments of the invention, the water passing to the electrolytic device provides an acid wash, for example, a continuous acid wash to the electrolytic cell plates or precipitation of heavy metal sulfides.

For example, in some embodiments, the pH controller is structured to be effective to add an agent, for example, hydrochloric acid and/or carbon dioxide gas, to water upstream of the electrolytic device, said agent being effective to provide an acidic wash to the electrolytic cell plates to substantially prevent or at least reduce the buildup of particulate material, for example, calcium carbonate scale, thereon.

For example, the apparatus may include a mechanism structured to pass the pH adjusting agent from an external storage tank into the stream of water entering the injector or into the first water. In one advantageous embodiment, the pH adjusting agent is drawn substantially directly into the injector assembly, for example, along with the precursor chemical agents. The pH adjusting agent may be released into the water stream at intermittent times, continuously, and/or specifically in response to a signal from the control unit.

In some embodiments, the control unit, upon receiving input from one or more sensors such as oxidation reduction potential (ORP) disposed in the water line, is programmed to adjust or vary the amount of power being supplied to the electrolytic device as needed to maintain a desired quality of water passed there from. In some embodiments, the control unit is capable of turning power to the electrochemical cell on and off in response to signals received from the sensor or sensors. By varying certain aspects of the power supplied to the electrochemical cell such as voltage, pulse width, amperage draw and the like, the quality, for example, the oxidation reduction potential, of water downstream of the cell can be modified.

In a particularly advantageous embodiment, the control system includes a water quality sensor, for example, an oxidation-reduction potential (ORP) sensor. The control system may be structured so that the ORP level in the second water passed from the electrochemical cell is maintained at a specific ORP mV value based on the desired water quality. For pharmaceutical treatment, an infrared spectrometer is used to identify the compound and the intermediate oxidation compounds to verify that the compound has been remove to required levels.

In some embodiments of the invention, the apparatus includes both a pH probe and an ORP sensor positioned, for example, to be in contact with water in the inlet line before it contacts the precursor injector. In such embodiments, the control system is preferably structured and configured to control and maintain appropriate ORP level and pH level based on input received from the sensors.

Advantageously, in accordance with the invention, the control system may be set to accommodate human users of the treated water, for example, bathers, swimmers and the like, with specific needs. For example, for enhancing the comfort of bathers with very dry skin, the ORP may be set to about 600 mV and the pH controller set to about 7.2. For swimmers with suppressed immune systems the ORP might be set at 750 mV.

In another aspect of the invention, the control system may be structured to be effective to control alkalinity of water passing to the electrolytic device, and may include means for adding or removing a substance from the water for regulating the alkalinity thereof.

For hard water sources for water features and cooling towers, for example, the hardness is intentionally precipitated on the cathode side of an electrolytic chlorinator cell. Carbon dioxide or bicarbonate salt can be added to maintain alkalinity above 100 ppm but less than 200 ppm to encourage precipitation of calcium or magnesium or other carbonate or sulfate salts on the cathode side of the electrochemical cell. Carbon dioxide can also be used the control the pH of the water. The advantage of carbonate salt precipitation is apparent during a current reversal cycle. When carbonate salt is converted to carbon dioxide gas and dissolved salt, gas pressure builds below the carbonate salt layer, which in turn causes mechanical failure of the adhesion layer, which in turn causes flakes of precipitated carbonated salt to be carried down stream by the flowing water and recovered in the filter for disposal.

For cooling tower applications and the like, dispersing agents as precursor compounds can be added to control the particle size distribution of the precipitants on the cathode in order to generate seed crystals that will in turn grow to filterable size thereby preventing scale build up on the cooling fin surfaces.

In one embodiment, alkalinity in the water is maintained between about 100 and about 200 ppm to encourage precipitation of hardness as a carbonate salt, thus reducing the total hardness in the body of water.

For example, the apparatus can be configured such that a sulfate salt can be added, for example, automatically, to the water on a regular or as needed basis in order to encourage precipitation of hardness as a sulfate salt, thus reducing the total hardness below about 150 ppm in the body of water.

In an advantageous embodiment, a collector is located downstream of the electrolytic chlorinator which serves to collect precipitate, for example, flakes of precipitated carbonate and sulfate salts. The collector may comprise a dead space in the flow line located between the electrochemical cell outlet and the inlet to the drinking water supply line, irrigation water supply, pool, cooling tower or other reservoir. A Y-trap plumbing fixture or spin filter may be provided for enabling removal of the precipitate collected in the collector. As dirt and pollution is sucked into the cooling tower, the electrochemical cell precipitates or agglomerates the solids for more efficient filtering while keeping the evaporation surface area clean.

When the water hardness must be maintained below about 150 ppm to prevent scale build up due to evaporation on natural or manmade stones or other porous solids, about 8 to about 40 ppm of sodium or potassium sulfate salt can be added, to the water for example, automatically via an appropriate chemical salt precursor cartridge, as determined by means of the control system, in order to encourage precipitation of calcium or magnesium sulfate salt on the cathode side of the electrode. The sulfate ion changes the water solubility of the hardness so that it will precipitate at pH greater than about 7.0-about 7.6. This sodium sulfate salt addition can drop the hardness to below about 50 ppm, to make clear water for fountains and maintain the beauty of the fountain or other water feature, by preventing unsightly tan or white scale buildup in areas of high evaporation. When hardness is dropped below about 120 ppm, care must be used to prevent leaching the calcium carbonate from any mortar exposed to the water. When dust or rain storms blow lots of lawn debris or dirt into the water feature, potassium peroxymonosulfate can be added, for example, automatically via the apparatus chemical cartridge system, and used as a shock and as a salt to remove the hardness addition from the dissolved dirt.

For chlorination systems the apparatus is structured such that chlorine is generated on the anode of the electrochemical cell(s) while other oxidants are generated from a combination of ozone, molecular oxygen, hydrogen or other materials on the cathode. For average flow velocities, low current densities, and low concentrations of ozone-containing water or gas originating from the ozone generator, having an ozone concentration less than about 100 ppm, the bi-polar cathode mostly produces the hydroxyl radical (OH) which immediately reacts with any organic compound or chloramines in the stream. For average flow velocities, low current densities, and air injection with ozone concentrations greater than about 100 ppm, a high ozone concentration will be left in the bubbles and the cathode generated hydrogen will make both hydroxyl radical (OH) and the hydroperoxyl radical (HO2). The hydroperoxyl radical can react with water (H2O) to form the hydroxyl radical (OH) and hydrogen peroxide (H2O2). For high concentrations of ozone-containing water or gas passed into the electrochemical cell, a high ozone concentration residual will be left in the bubbles, and the cathode generated hydrogen will make both hydroxyl radical (OH) and the hydroperoxyl radical (HO2) and some trace chlorine dioxide (ClO2) generated on the anode at high current densities. Some of the ozone and/or HO2 also reacts with the water to make hydrogen peroxide (H2O2).

In some embodiments of the invention, the control system is configured and structured to control the ozone generator in addition to the precursor chemical cartridges, collectively called the precursor cartridge carousel or bulk feed precursor feed stocks.

For example, in use in a swimming pool, the control system can be used to create a water stream passing from the pool into the apparatus to achieve a high custom mixed-oxidant concentration in order to cause rapid oxidation of organic loading. As the ORP reading approaches a pre-determined set point, the oxidant matrix and/or concentration can be reduced, or changed to maximize chlorine or hydrogen peroxide residual in the water at a set point turn off. In a membrane cell we can recycle either the anolyte stream or the catholyte stream to enrich the chlorine or hydrogen peroxide output of the cell.

Preferably, the ozone generator, chemical precursor subsystems, air pump and the electrochemical cell are coupled in a manner effective to substantially increase or enhance the amount and/or concentration of mixed oxidants, for example, hydroxyl radicals, ozone and hydrogen peroxide produced by the electrochemical cell. For example, the ozone generator, chemical precursor subsystems, air pump and the electrochemical cell are directly coupled together so that the first precursor-laden water flows directly from the injector assembly into the electrolytic device. The conduit or other duct providing water communication between the injector assembly and the electrolytic device may or may not include an effective degassing structure, effective mixing structure, and/or effective mixing and degassing structure located there along. The apparatus is preferably structured such that the stream of precursor-laden water is maintained in an aerated, for example, oxygenated, state when the stream enters the electrolytic device, thereby causing the electrolytic device to produce a stream of water having enhanced concentrations and/or quantities of ozone and other oxidants, for example, hydroxyl radicals.

The apparatus is advantageously adapted for use in a water reservoir such as a water storage tank, irrigation reservoir, industrial reservoir, water treatment tank, pond, river, pool, spa, cooling tower or the like with or without a circulation system.

In some embodiments of the invention, the apparatus is disposed in a bypass line or a side stream allowing the apparatus to run independently of, or in conjunction with the reservoir circulation system.

In other embodiments, one or more components of the apparatus, for example, the electrolytic device and the chemical precursor subsystem injector assembly, are mounted substantially in-line with the main conduit of the circulation, or flow-through system. Advantageously, both of these components of the system may be enclosed in a common housing structured to be connectable to a main water line of an existing circulation, or flow-through system.

Preferably the chemical precursor injector is connected substantially directly to the electrochemical cell for example, by a single "short as possible" conduit or duct. Even more specifically, in one advantageous embodiment of the invention, the apparatus includes no separate precursor injection device as the injection takes place under pressure directly into the electrochemical cell either into the first section of the cell for a cell under the influence of a single ultrasonic zone, or into individual ultrasonic zones of the electrochemical cell where a mixture of kHz and for MHz frequencies of ultrasonic sound are employed to uniformly distribute cavitation sites throughout the water volume. In this advantageous embodiment, MHz frequencies create greater concentrations of hydroxyl radicals are produced in the volume, thereby providing a greater range of contaminant treatment options and greater efficiencies. This hydroxyl generating effect is independent of water quality, salt loading and/or organic loading and indeed can be used on sludges with an aqueous continuous phase, however pulsed DC or AC electrode current is usually used with sludges to maximize the effective treatment with MHz ultrasound.

In another aspect of the invention, the apparatus includes no separate mixing and or/mixing degassing vessel, or contact chamber, located downstream of the chemical precursor injector and upstream of the electrochemical cell.

In another embodiment of the invention, the apparatus includes a separate degassing unit to prevent vapor lock of downstream equipment such as pumps, irrigation lines and the like.

A method of treating water in a reservoir according to the present invention comprises the steps of withdrawing a stream of water, for example, a stream of water containing a halogen-containing salt, such as sodium chloride, from the reservoir; injecting precursor chemical(s) into the stream of water; introducing the precursor-laden stream of water into an electrolytic cell, for example, having a variable power supply; returning the mixed oxidant laden and chlorinated stream of water to the reservoir; monitoring the quality of the water in the reservoir; and varying the power supplied to the electrochemical cell as needed to maintain the water quality at a desired level. Advantageously, the step of monitoring the quality of the water comprises monitoring a property, for example substantially continuously and automatically monitoring a property, for instance the ORP, of the water, using an electronic sensor. The output of the sensor is transmitted to an electronic controller that automatically varies the power, or technical aspects of the supplied power to the electrochemical cell as needed.

In one embodiment of the method, wherein the reservoir includes a circulation system, the circulation system including a main conduit communicating with the reservoir and a primary pump for drawing water through the main conduit, the steps of injecting chemical precursors into the stream of water and introducing the precursor-laden stream of water into the electrochemical cell occur within the main conduit.

In an alternate embodiment, the step of withdrawing a stream of water from the reservoir comprises diverting a stream of water out of the main conduit and into a secondary circulation system, and the steps of injecting chemical precursors into the stream of water and introducing the precursor-laden stream of water into the electrochemical cell occur within the secondary circulation system. In this embodiment, the secondary circulation system includes a secondary pump independently operable of the primary pump. This allows the water treatment process to be performed substantially continuously, even when the primary pump is not operating.

The precursor enhanced electrochemical systems and methods of the present invention possess numerous advantages over prior art systems and methods using electrolytic chlorination alone. These benefits include a custom oxidant/reductant stream that can be adjusted in real time with a programmable logic controller, or the like, to varying water quality parameters and/or treatment requirements. The present invention can be used to generate enhanced concentrations and quantities of specific oxidants/reductants based on specific water quality issues for example, opening a pool or spa in the spring where the water is green with algae might involve adding additional hydrogen peroxide precursor solutions to the electrolytic cell to generate large volumes of hydroxyl radicals for algae destruction. In larger applications a freshwater, or saltwater intake to a water treatment facility experiencing red tides, or other blooms might use a similar hydrogen peroxide precursor feed in volume to oxidize the excess organic matter to reduce trihalomethane (THM) formation post disinfection. The present invention can be fabricated into a low-cost chlorine dioxide (CLO2) generator using a precursor of sodium sulphate plus sodium chlorate on the anode side to generate CLO2 gas on the anode. A specific benefit of the present invention in a pool environment is that high concentrations of salt are not required as in a saltwater pool, to generate oxidizing agents. Another benefit to the present invention is that water can be used directly in reverse osmosis (RO) membrane systems because CLO2 does not damage RO membranes. The chloride corrosion on pool equipment and destruction of stone surfaces and pool accessories associated with the use of saltwater pools is minimized via use of the present invention because salt concentrations below 1,500 ppm can be used without using silver and/or copper ionization processes. In the present invention the residual oxidant(s) produced is hydrogen peroxide, and/or other micro- or nano-sized oxidants that become thoroughly dispersed within the volume to be treated due to bubble size and that tend to last longer in suspension.

First, mixed oxidants which have a broader killing range than straight chlorine are created in the electrochemical cell. On the cathode surface, atomic hydrogen (H) combines with molecular ozone (O3) to form the hydroxyl radical (OH) and molecular oxygen (O2). The molecular oxygen from the injected air can also combine with atomic hydrogen to form the hydroperoxyl radical (HO2). Both radicals can oxidize bio-film and other organic particles or compounds suspended in the water or combine with water molecules to make the hydrogen peroxide molecule (H2O2), which is a long half-life sanitizer like chlorine. The amounts and concentrations of mixed oxidants produced via the electrochemical cell can be dramatically increased by use of select precursor compounds.

With the increased pulsed DC current density provided by the electrochemical cell and in the presence of dissolved ozone, hydrochloric acid (HCl) and hypochlorous acid (HClO) and a very tiny percentage of chlorite acid (HClO2) can form on the anode surface. Typical oxide coatings on pool, cooling tower and spa electrodes are optimized for the production of chlorine with a small production of oxygen for chloride salt concentrations of 2,000-3,500 ppm. With boron-doped diamond-like or iridium oxide coatings on the anode, the electrochemical cell operation can be extended to the salt content approaching those of fresh water. Field experience shows that a voltage pulse is needed to push current across the electrode plate gap while preventing an arc formation when organic matter bridges the gap. As the salt content (TDS) of the water approaches 100 ppm, a tiny amount of ozone and chlorine dioxide can be produced along with the molecular oxygen on the anode surface, particularly of boron-doped diamond electrodes to increase the broadband microbial killing ability of the mixed oxidants produced with the chemical precursor enhanced electrochemical system. With the increased current density of the voltage pulse, the current density can rise between the plates to deliver lethal dose of electrical current to the bacteria or algae cell. The electrical conductivity of the current invention can be enhanced by the addition of carbon dioxide, sulfur dioxide, or gases like argon. This particular embodiment is optimized for the production of hydrogen peroxide via streaming current electric discharge at the anode plate(s).

In addition, water treated according to the apparatus and/or method of the present invention is more sanitary due to the generation of mixed oxidants such as: hydrogen peroxide, ozone, chlorine dioxide, hydroxyl radicals, peroxyl radicals, persulphates, percarbonates, and the like than water treated by electrolytic chlorination alone, and it will contain a lower residual chlorine level at an equivalent ORP meter reading.

For instance, because the bulk of the oxidation and sanitizing is performed by advanced oxidation processes and mixed oxidants, the system requires a smaller electrochemical cell and ozone generator than systems using only electrolytic chlorination or ozone with a salt, for example, a sodium chloride salt or a bromide salt. Accordingly, the total cost of a chemical precursor enhanced electro-chlorination system can be reduced because the potential size of the electrodes, housing size and related power supply can be reduced.

The addition of certain chemical precursors like ozone and/or anti-scalants upstream to the electrochemical cell also inhibits scale formation in the electrolytic cell. Ozonated air bubbles act like a micro-flocculent attracting tiny particles of calcium carbonate scale, thus keeping the cathode surface reasonably clean even if the calcium ion concentration rises above about 240 ppm in the water. The bubble flow helps remove the flakes of calcium carbonate after a reverse in cell polarity. Another advantage of the ozone and/or air addition is that the organic matter that normally combines with the calcium carbonate build up on the cathode is removed by oxidation. This could eliminate the need for the expensive electronic "self-cleaning cycle" that is required by most bipolar electrolytic chlorination systems, but field experience shows that "self-cleaning cycle" may still be useful but the delay time can be extended by a factor about 4 to about 8. Thus, by adding ozone and/or air and reversing the polarity occasionally on the electrolytic cell, the system can become 'maintenance free' for the whole swimming season of the pool. For cooling towers and aquatic animal habitats, the present invention greatly reduces the amount and/or frequency of maintenance, for example, during the annual maintenance cycle. The current embodiment is of particular importance when using the ultraviolet (UV) lamp version of the electrolytic/electrochemical cell because the cell is generating ozone in the volume which acts to micro-flocculate the hardness compounds and organic compounds which in turn then cannot precipitate, build-up, or foul the surface of the UV lamps (anodes). The micro-flocculated seed crystals reduce the build up rate of carbonates on cathode surfaces. A particular embodiment of the current invention specifically uses boron-doped diamond coated quartz sleeves on the UV lamps to generate mixed oxidants at the coating surface. The boron-doped diamond coating is deposited on the quartz sleeves in thicknesses ranging from 30 nm to 300 nm to prevent blockage of the UV light.

The polarity reversal during the "self-cleaning cycle" is destructive to the electrolytic cells themselves, damaging the precious metal oxide, DSA, or boron-doped diamond coatings by reducing a tiny amount of oxide to the precious base metal when the anode surface is switched to the cathode surface. For higher current densities, titanium hydride is created at the coating interface. When the polarity is switched again, the acid created on the new anode surface dissolves the precious base metal until it reaches a new layer of precious metal oxide, thus shortening the life expectancy of the cells. For higher current densities, the titanium hydride is converted to titanium oxide and water vapor which delaminates the oxide coating. The use of the present systems can prevent or greatly reduce the reduction of the oxide coating to base metal by absorbing most of the atomic hydrogen with dissolved oxygen or ozone to create hydroxyl radicals, extending the cell life, and reducing costs associated with replacement parts The present invention also uses boron-doped diamond electrodes as a specific embodiment of the apparatus to counter the degradation effects of polarity cycling. Extended electrode life of more than 5,000 hours has been witnessed even under frequent polarity reversals.

Furthermore, the advanced oxidation processes and mixed oxidants formed by the present invention oxidize the urea and ammonia based substances that would otherwise react with chlorine to form chloramines. The advanced oxidation processes and mixed oxidants also oxidize organic matter that would otherwise react down to the chain termination of chlorinated methane. Accordingly, fewer chloramines or chlorinated methanes are formed. Those that are formed are destroyed by the mixed oxidants. Mixed oxidants can also oxidize chlorinated hydrocarbons such as methyl chloride, methylene chloride and chloroform which are stable intermediate oxidation products of chlorine-organic matter reactions. Thus, the need for periodic superchlorination is reduced or eliminated. As a further embodiment the water can be heated to over 140 F degrees to convert all nitrogen compounds: nitrates, nitrites, urea, ammonia, proteins, amino acids and the like, into nitrogen gas and removed from the system.

Moreover, the ozone component of mixed oxidants imparts surface charges to the suspended organic particles causing them to stick together, thus becoming more filterable. This process, know as "micro-flocculation", allows ozone to provide clearer water than is possible with chlorine alone. In fact, for water features such as fountains, the water droplets can temporarily bead on the surface, due to the increased surface tension of the clean water, creating unique visual effects for sunlight and artificial night light.

A further embodiment is that we can use the present invention to destroy double-bonded carbon compounds to reduce contaminant structure and/or toxicity and/or density and/or molecular weight. An example of this would be the destruction of benzene, or phenol like compounds.

For the commercial spas, pool-spa combinations, or water features such as spraying fountains or cooling towers, the addition of sodium bromide to the water stream entering the apparatus can reduce the evaporation rate of chlorine from the main body of water. Chlorine or ozone can oxidize the bromide ion to the bromite ion. The hypobromite ion does not decompose like hypochlorite ion when exposed to the ultraviolet light spectrum from the sun or low-pressure mercury lamp, thus bromine sanitizer has a longer half-life in the water.

Accordingly, new customized water treatment apparatus and methods are provided by the present invention. Organic sticky or gelatinous compounds can be partially oxidized into non-sticky carbon-like particles to prevent plugging of macro or ultra-filtration membranes such as filtering Kraft water from a paper pulping process. Hardness salts can be precipitated and smaller organic compounds can be oxidized in front of a nano-filtration membrane to improve the rejection rate of certain cations and increase the production time between wash cycles. Hardness salts can be precipitated and dissolved organic compounds can be oxidized to decrease the SDI index from 5+ to near zero for longer production run times on reverse osmosis membrane desalination systems.

Both chlorine evaporation and oxidation of the organic compounds cause the pH of the water to rise over time, which in turn requires the manual addition of hydrochloric acid to prevent the precipitation of calcium salts. The present invention can automate this process as the hydrochloric acid or carbon dioxide can be added as a precursor chemical to the precursor chemical subsystem carousel and be controlled via pH sensor input. Calcium carbonate or calcium sulfate usually will precipitate when the pH rises above about 7.9 on the edges where the water splashes against wall or surface of a water feature. The precipitated calcium salts leave ugly white and tan splotches on the surface which has to be removed with scrubbing using a lime removing product. Hydrochloric acid is used to replace the chlorine that evaporated from the water or to combine with the calcium ion to keep it soluble in the water.

The pH controller may be set to maintain the pH of the water in the reservoir at between about 7.1 to about 7.4 while an acid component, for example, hydrochloric acid, is added to the water stream upstream of the electrolytic cell in an amount effective to maintain concentration of the chloride ion in the water at surfaces of the electrolytic cell plates to provide an acid washed on a regular basis. A chemical precursor enhanced electro-chlorination system can be structured to be substantially 'maintenance free' during most of the swimming season and to reduce maintenance costs in cooling tower applications. The pH controller is set to not let the pH drop below about 6.5 downstream of the electrolytic cell to prevent leaching or oxidation of metal pump parts or heat exchangers surfaces.

Experience shows if the pH drops below about 6.5, copper or stainless steel heat exchangers will dissolve and precipitate on the pool or spa surface changing the color to a light blue-green or light brown-gray respectively. Cooling towers electrolytic cells usually require additional acid washing to remove harden scale buildup. The present invention minimizes the need for acid washing by using the superior properties of boron-doped diamond electrode coatings such as high thermal conductivity, high hardness and chemical inertness, a wide electrochemical potential window in aqueous and non-aqueous media, very low capacitance, a wide pH window, extreme electrochemical stability and resistance to regular polarity reversals.

A further embodiment of the present invention includes the use of ultrasound plus the boron-doped diamond electrodes to precipitate silica out of solution in cooling tower applications and the like. This negates or minimizes the need for pressure washing of active surfaces in the cooling tower.

In addition, the control system included with the chemical precursor enhanced electrochemical systems of the present invention allows treatment of the water using chlorine sanitizers to adjust input of compounds and/or the amount of electrolytically-generated chlorine containing agents, as desirable or necessary in response to changing conditions, substantially without need for user intervention. If the acid precursor cartridges or carbon dioxide cartridges of the present invention are large enough, the pH and ORP controller can prevail over water and organic material additions after a rain, dust or wind storm. For larger water reservoirs the direct feed of the bulk acid and bulk carbon dioxide chemical precursors to the electrochemical cell will be utilized in the present invention. The immediate treatment of contamination prevents the introduction of resistant strains of black algae and leaf mold growth in porous surfaces of the tile grout, cement, or plaster of the pool, spa, and fountain or on evaporation enhancers in the cooling tower.

For aquatic animal habitats in the zoo, after the animal feeds or defecates in the water, the ORP meter will detect the organic matter addition to the water. The filter system will strain the large particles from the water while the chemical precursor enhanced electrochemical water treatment system will oxidize the fine fiber particles, bacteria and yeast bodies, and gastric enzymes. The pH controller will then corrected the pH with acid to neutralize the ash left over from the oxidation of organic matter. A small amount of sodium or potassium sulfate salt can be added to the water via the precursor chemical carousel to encourage the precipitation of the ash in the electrochemical cell which is removed by downstream filtering. A slip stream of the zoo habitat water is heated within a separate electrolytic/electrochemical cell to convert the ammonia and urea to nitrogen gas to remove the algae food source from the water. The other option is to convert the ammonia to hydrogen gas on the cathode, electrolytically. By reducing the calcium and magnesium loading in the water via electrochemical precipitation we can prevent the formation of calcium-rich biofilms on aquatic surfaces. This in turn allows for lower concentrations of oxidants to rid the pool of black molds, or other colony-forming species.

The present invention can be used specifically as a perchlorate reducing and destruct agent or a perchlorate chlorine dioxide generator when the perchlorate ion is used as a precursor compound. One option to the present invention has the percholorate stream being fed to the anode compartment of the electrolytic device or cell(s) to produce chlorine dioxide gas from the perchlorate ion. The other option to the present invention, is reduction of the perchlorate ion to chlorine by passing the perchlorate ion through the cathode chamber of the electrolytic device or cell(s).

The present invention can be used as a substitute lixiviant solution in leach mining applications that use cyanide as the lixiviant leaching agent. The cyanide solution as a known contaminant of environmental concern can be treated with a combination of UV photolysis and electrochemical oxidation with or without hydroxyl generating precursors. The present invention uses a UV lamp spectra preferably between 172 nm to 400 nm as a pulsed DC anode either alone, or in combination with DSA, or boron-doped diamond electrodes.

The present invention can be used in solution mining applications to generate specific pH ranges for effective leaching of precious metals like gold, silver, the platinum group metals: platinum, palladium, rhodium, ruthenium, osmium and iridium and solution mining of uranium using custom precursor mixtures in the electrolytic/electrochemical cell(s), with or without membranes, to create various pH conditions ideal for complexing of the metals in the ore body. The present invention includes the use of ultrasonic transducers attached to the electrolytic cell(s) to better mix the solutions, separate metals from soil particles in solution, and to keep the electrode surfaces free of calcium carbonate and/or calcium sulphate type build-ups which would lead to electrode failure and/or process failure. The present invention is ideally-suited to the onsite generation of mixed-oxidants and/or sodium hypochlorite solutions in electrolytic/electrochemical cell(s) for borehole injection, and subsequent recovery, in the solution mining operation using brine, electricity, water and pre-packaged, or bulk precursor compounds to generate the custom pH solutions for the unique requirements of each solution mining application. The present invention extends to the use of real time monitoring of pH and other solution mining parameters in the ore body and the associated adjustment of the electrolytic process via programmable controller or the like, to generate a modified solution for continuous injection.

The present invention has important application in the clean-up of mine wastewaters such as acid mine drainage by using the electrolytic cell(s), ultrasonic transducers and appropriate precursor compounds adjusted in real time to plate out heavy metals on the electrodes in a custom electrowinning process, or to precipitate, separate, change or destroy various waste stream constituents via electrochemical solutions, based on changing metals or other constituent concentrations in the water to be treated, and/or other sensor feedback. Furthermore, complimentary applications extend to acid mine drainage treatment where the mixed oxidant/mixed reductant solutions could be used to kill the microbes that leach heavy metals into the water supplies, or in heap leaching operations the use of the on-site, real-time, electrochemically generated solutions could be used to destroy cyanide waste streams coming from gold leaching operations and the like.

The present invention comprises an apparatus that represents a major improvement over prior electrochemical or electrochlorination systems for disinfection and/or advanced oxidation processes. Broadly, it is the object of the present invention to provide an improved electrochlorination and electrochemical system for the on-site generation and treatment of municipal water supplies and other reservoirs of water, by using a custom mixed oxidant and mixed reductant generating system for the enhanced destruction of water borne contaminants by creating custom oxidation-reduction-reactant chemistries in real time if necessary. It is the further object of the present invention to provide a range of chemical precursors that when acted upon in an electrochemical cell either create an enhanced oxidation, or reduction environment for the destruction or control of contaminants. It is also the intent of the present invention to introduce via the chemical precursor injection subsystem those chemical agents that can be used to control standard water quality parameters such as total hardness, total alkalinity, pH, total dissolved solids, and the like infrequently, or in real time based on sensor inputs and controller set points.

To those skilled in the art, it is apparent that the use of electrochemically-generated mixed oxidants and electrochemically-mediated advanced oxidation processes for disinfection, organics destruction, and contaminant destruction is substantially superior to electro-chlorination systems for all applications. These and other objects of the present invention will become apparent to those skilled in the art from the following detailed description of the invention and the accompanying drawings.

The present invention can use all types of dimensionally stable anodes, boron-doped diamond coatings, sub oxide titanium ceramic, lead-oxide or titanium-oxide coatings, and/or other relevant electrode coatings, in addition to ultrasonic treatment at varying frequencies to generate specific treatment zones within the electrolytic cell(s). However, the use of ultrasonic treatment is not required, but preferred because the cell is then self-cleaning.

The present invention extends to the use of UV lamps operated as virtual anodes to create an electrolytic cell and/or electrolytic device thereby using the UV lamps for multiple simultaneous purposes: disinfection, photolysis, and advanced oxidation processes such as oxidation of elemental mercury to insoluble mercury oxide. The present invention relates to the use of ultrasonic treatment to prevent scaling or fouling of the UV lamp quartz sleeves and the electrodes and to generate OH radicals specifically, and other mixed oxidants such as: ozone, peroxomonosulfuric acid, peroxodisulfuric acid, sodium peroxycarbonate, peroxodiphosphate, and hydrogen peroxide to destroy organic compounds in water at the surface of the UV lamps when operated as virtual anodes, and/or coated with a boron-doped diamond coating. When the UV lamps are operated as virtual cathodes, metals are reduced to elemental state, hardness ions are precipitated, and free radicals are created from hydrocarbons, cyanide, hydrogen sulfide, and ammonia. The combination of ultrasonic and ultraviolet light can be used to reduce the molecular weight of brown humic acid to make amber fulvic acid, which is a direct absorbing plant fertilizer. The present invention utilizing UV lamps in electrolytic reactors relates also to the ability to determine and generate the customized blends of oxidants/reductants and/or reactants in real time required by the various water treatment processes based on feedback sensors in the water to be treated and the modulation of UV output to effect the most efficient process.

The present invention preferably uses individual ultrasonic transducers each operating at different frequencies, and/or in sweep frequency mode in either the 12-70 kHz range, or 0.1-1 MHz range to create individual zones of electrochemical treatment within the electrochemical cell, or cells.

The present invention is a significant innovation over current electrochemical on-site oxidant generation practice where a near saturated brine, water and electricity are used to generate a fixed concentration of sodium hypochlorite solution and/or mixed oxidant solution in a side stream process for the disinfection of municipal drinking water supplies, cooling tower treatment and the like, or in swimming pool and spa applications where chlorides in the pool water and/or ozone gas are used as precursors to a standard electrochemical cell to produce sodium hypochlorite and more hydroxyl radicals since in the present invention, there is a potential suite of precursors that can be drawn upon in real time to produce the exact concentrations and amounts of varying electrochemical products such as: ozone, peroxomonosulfuric acid, peroxodisulfuric acid, sodium peroxycarbonate, peroxodiphosphate, and hydrogen peroxide that are needed by the water to be treated based on sensor feedback to a system controller to create a dynamic, not fixed, electrochemical treatment process. The present invention relates to the use of ultrasonic treatment to prevent scaling or fouling of the electrodes, to improve mixing and to generate OH radicals specifically along with other oxidants within the electrochemical cell or device. It is known to water treatment professionals that water quality is constantly changing and so in the typical water treatment process, the tendency is towards overdosing of chemicals to effect the possibility that all changes in water quality have been addressed, particularly organics destruction, however this often leads to the production of unwanted byproducts which are known carcinogens such as trihalomethanes (THM), or haloacetic acids (HAAC). In the present example, the present invention can be used to destroy more of the organic compounds in the water by the production of enhanced quantities and concentrations of hydroxyl radicals (OH) that will react more quickly than the chlorine compounds produced in the electrochemical cell so that reduced amounts of THMs and HAACs can be expected from the current invention over traditional electrochemical processes as described earlier in this paragraph.

The present invention can be used to generate enhanced amounts and concentrations, and customized chemistry of mixed oxidants, or reductants, or reactants for the enhanced disinfection of water supplies and volumes of water, destruction of dangerous pathogens like giardia and cryptosporidium, destruction of biological agents, precipitation of heavy metal salts or calcium, barium, or magnesium hardness and enhanced destruction of organic compounds such as pharmaceuticals, endocrine compounds, pesticides, industrial compounds, and enhanced destruction of inorganic compounds such as hydrogen sulfide and mercaptans in aqueous solutions in full flow and side stream applications.

The present invention can be used specifically in arsenic removal systems as a pretreatment step in front of the ion-exchange resins to oxidize arsenic III to arsenic V at an ORP of approximately 700 mV and to precipitate hardness ions that compete with the absorption on the resin beds. The present invention presoftens the water prior to reaching the resin beds.

The present invention can be used to modify water quality chemistry in real time based on sensor feedback and subsequent injection of water quality adjusting agents such as for pH, alkalinity, total dissolved solids, turbidity and disinfection into the electrolytic device for electrochemical transformation into the active agent, or via injection of integrated precursor material feed stocks, or bulk feed stocks into the electrolytic device for distribution to the water volume being treated.

The present invention can also be used to produce hydrogen electrolytically using ammonia as the precursor chemical, for example from a sewage digestor, overcoming much of the cost and limitations of deriving pure hydrogen for on-site power generation for fuel cell applications. The present invention converts ammonia electrolytically directly into nitrogen gas avoiding the usual biological conversions required to take ammonia to nitrate and nitrate to nitrogen gas.

The present invention can be used in solution mining applications to generate specific pH ranges for effective leaching of precious metals like gold, silver, and the platinum group metals: platinum, palladium, rhodium, ruthenium, osmium and iridium, as well as uranium, through the use of custom precursor mixtures in the electrolytic/electrochemical cell(s), with or without membranes, to create various pH conditions ideal for complexing of the metals in the ore body under treatment.

The present invention is ideal for the use of enhanced electrolytic/electrochemical cells operating in an on-site generation mode using only salt, water, electricity and custom precursor chemical mixtures, either prepackaged, or in bulk, to generate custom solutions which are injected into boreholes for the dissolution of the materials to be mined. The present invention envisions a real time monitoring of the underground solution process parameters of interest such as pH and concentration of the lixiviant solution, and the modification of the associated injected solution parameters via chemical precursor addition and/or air to effect the desired changes in solution chemistry. The present invention may include the use of ultrasonic transducers attached to the electrolytic cell(s) to better mix the solutions, separate metals from soil particles in solution, and to keep the electrode surfaces free of calcium carbonate and/or calcium sulphate type build-ups which would lead to electrode failure and/or process failure.

The present invention has important application in the clean-up of mining wastewaters by using the electrolytic cell and appropriate precursor compounds adjusted in real time, to plate out heavy metals on the electrodes in a custom electrowinning process, or to precipitate, separate, change or destroy various waste stream constituents via electrochemical solutions, based on changing metals or other constituent concentrations in the water to be treated, and/or other sensor feedback. Furthermore, complimentary applications extend to acid mine drainage treatment where the mixed oxidant/mixed reductant solutions could be used to kill the microbes that leach heavy metals into the water supplies, or in heap leaching operations the use of the on-site, real-time, electrochemically generated solutions could be used to destroy cyanide waste streams coming from gold leaching operations and the like.

Many of the envisioned applications for the present invention extend specifically to water and wastewater treatment, perchlorate treatment, chlorine dioxide generation, solution mining operations, irrigation water treatment, industrial water treatment, oil & gas produced water treatment, treatment of rivers, ponds and reservoirs and groundwater remediation processes.

Additional aspects and advantages of the present invention are set forth in the following description, figures, and claims.

BRIEF DESCRIPTION OF THE DRAWINGS

FIG. 1 is a schematic diagram showing a water treatment apparatus according to the present invention applied to a side stream of the main water flow where the precursor compounds are supplied from the precursor chemical carousel due to the smaller volume of precursors required, and this implies in general a smaller volume of water to be treated such as a private pool, or spa, water feature, industrial process and the like.

FIG. 2 is a schematic diagram showing a water treatment apparatus according to a further embodiment of the invention applied to a side stream of the main water flow where external chemical precursors either introduced as gases, or liquids are required in volume, due the types and larger volumes, or bodies of water to be treated such as a commercial pool for example, water park, drinking water treatment plant and the like.

FIG. 3 is a schematic diagram showing yet a further embodiment of the invention applied to the full flow of water and where the precursor compounds are supplied from the precursor chemical carousel due to the smaller volume of precursors required, and this implies in general a smaller volume of water to be treated such as a private pool, or spa, water feature and the like.

FIG. 4 is a schematic diagram showing another water treatment apparatus in accordance with the invention applied to the full flow of water where external chemical precursors either introduced as gases, or liquids are required in volume, due the types and larger volumes, or bodies of water to be treated such as a commercial pool for example, water park, industrial treatment process, irrigation water treatment, drinking water treatment and the like.

FIG. 5 is a schematic diagram showing yet a further embodiment of the invention applied to the full flow of water and where the precursor compounds are supplied from the precursor chemical carousel, directly into the electrochemical cells and not upfront of the electrochemical cells, due to the smaller volume of precursors required, and this implies in general a smaller volume of water to be treated such as a private pool, or spa, water feature and the like.

FIG. 6 is a schematic diagram showing another water treatment apparatus in accordance with the invention applied to the full flow of water and where volume precursor compounds are supplied in bulk as gases directly into the electrochemical cells and not upfront of the electrochemical cells, where due the types and larger volumes, or bodies of water to be treated such as a commercial pool for example, water park, drinking water treatment plant and the like.

DETAILED DESCRIPTION OF THE INVENTION

Figure 1:
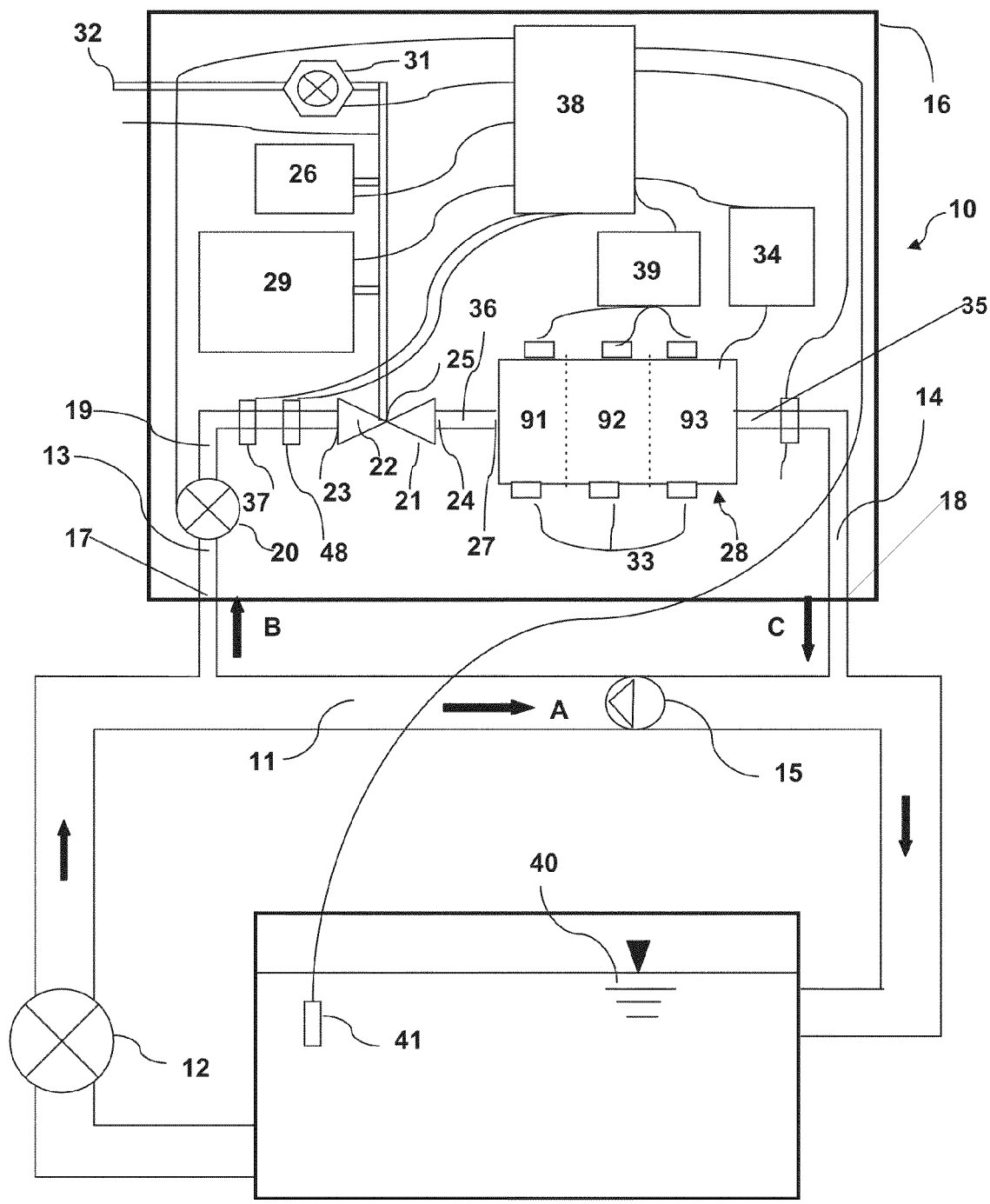

With reference to the figures, the preferred embodiment of the present invention will now be described as it may be applied to specific configurations of electrolytic/electrochemical cell(s) for water and/or wastewater treatment. Referring now to FIG. 1, a water treatment apparatus 10 is shown in accordance with the present invention, adapted for use in a water reservoir 40, such as a swimming pool, spa, irrigation water treatment, industrial water treatment, groundwater remediation treatment, solution mining application, river, pond, aquatic mammal tank, fountain, drinking water plant, or the like.

Advantageously, water is circulated through the reservoir 40 by a circulation system including a main conduit 11 and a primary pump 12. In the embodiment of the invention shown, a secondary circulation system, or side stream, including a secondary supply conduit 13 and a secondary return conduit 14, is provided for diverting at least a portion of a stream of water, initially traveling in the direction shown by arrow A, from the main conduit 11 through the water treatment apparatus 10, in the direction shown by arrow B, and subsequently returning the treated water back to the main conduit in the direction shown by arrow C. A check valve 15 may be used to prevent backflow of treated water from conduit 14 to conduit 13.

Apparatus 10 generally includes a housing 16 having an inlet opening 17 coupled to the secondary supply conduit 13 and an outlet opening 18 coupled to the secondary return conduit 14. An inlet line 19 passes a water stream from inlet opening 17 through a secondary pump 20, which draws water through the apparatus 10.

Downstream of pump 20 is an injector assembly 21 comprising a venturi injector 22 having a water inlet port 23 for receiving water ejected from pump 20, and an inlet 25 for receiving precursor compounds, for example, an oxygen containing and/or ozone containing gas, or aqueous oxidant solution and hydrogen peroxide liquid. Apparatus 10 may further include an electrolytic, or corona discharge ozone generator 26 for producing ozone and a precursor-laden water outlet 24 which releases a stream of water containing precursor compounds, air, or other gases and/or being substantially aerated, into a duct 36 connected to an inlet end 27 of an electrochemical cell 28.

In a preferred embodiment, electrochemical cell 28 is fed via a plumbed manifold 45 to venturi injector 22 with ozone from ozone generator 26, and/or chemical precursors from the chemical precursor carousel 29, and/or air drawn in via a small air pump 31 from outside 32 of apparatus housing 16.

In a preferred embodiment, electrochemical cell 28 comprises a bipolar cell (having electrochemical zones 91-93 as depicted in FIG. 1), or multiple bipolar cells arranged in series, each of which may, or may not, have a separate ultrasonic transducer 33 attached. Electrochemical zones 91, 92, 93 are defined by their respective ultrasonic zones of influence. In FIG. 1. there are three ultrasonic transducers 33 attached to electrochemical cell(s) 28 and therefore there are three individual and unique water or water treatment zones within the electrochemical cell, or series of cells. Each of these ultrasonic transducers may be operated at discrete frequencies, or combinations of frequencies, in the kHz and MHz ranges, or in sweep frequency mode in the kHz or MHz range in the current invention. There could be any number of such unique treatment zones employed in the current invention. For simplicity three zones are shown in FIG. 1. Electrochemical cell 28, is connected to an energy source, preferably a variable power supply 34. After the water passes through electrochemical cell 28, the water contains mixed oxidants, for example: chlorine, chlorine dioxide, ozone, hydrogen peroxide, and hydroxyl radicals although the hydroxyl radical oxidation effect is short lived. This highly effective sanitizing stream then passes through outlet 35 which communicates with the housing outlet 18, allowing the treated water to be passed to the main supply conduit 11 via the secondary return conduit 14 and to an application for use, for example a pool, spa, fountain cooling tower, drinking water treatment supply, or other reservoir requiring or benefited by sanitized water.

Preferably, chemical precursor injector 22 and electrochemical cell 28 are coupled in a manner effective to substantially increase or enhance the amount and/or concentration of mixed oxidants, for example, hydroxyl radicals, that are produced by electrochemical cell 28. For example, apparatus 10 is preferably structured such that the stream of precursor-laden water leaving chemical precursor injector 22 is maintained in an aerated state when the stream enters electrochemical cell 28. This will allow or cause the electrochemical cell to produce a useful stream of water having hydroxyl radicals and other mixed oxidants that are useful in sanitizing a variety of microorganisms, including resistant organisms like cryptosporidium and giardia, for example.

In a preferred embodiment, chemical precursor injector 22 is substantially directly connected, preferably by single duct 36, to electrochemical cell 28. In this embodiment, apparatus 10 preferably includes no mixing vessel or contact chamber effective to contain and mix precursor-laden water passed to electrochemical cell 28. It has been found that by directly connecting chemical precursor injector 22 and electrochemical cell 28 as shown, and providing a substantially continuous flow of aerated water into electrochemical cell 28 during operation of apparatus 10, the apparatus 10 will produce a variety of hydroxyl radicals that would not be produced if the water was degassed prior to entering electrochemical cell 28, for example, by first passing the water through a mixing chamber, degassing chamber, contact chamber or the like prior to entering electrochemical cell 28.

Ozone generator 26, chemical precursor injector 22, and electrochemical cell 28 may be of any suitable type known in the art. For instance, the components of ozone generator 26 may be similar in structure and function to those disclosed in Martin, U.S. Pat. No. 6,500,332, the entire disclosure of which is incorporated herein by this specific reference, or an electrolytically generated ozone using for example, boron-doped diamond electrodes. Electrochemical cell 28, where chlorine is a desired byproduct, may be similar to any of those disclosed in Kosarek, U.S. Pat. No. 4,361,471, Wreath, et al., U.S. Pat. No. 4,613,415, and Lynn, et al., U.S. Pat. No. 5,362,368, the entire disclosure of each of which is incorporated herein by this specific reference. The most useful applications for electrochemical cell 28 will be where the cell is used to generate mixed oxidants such as: ozone, hydroxyl radicals, hydrogen peroxide and peroxygen species in addition to chlorine species.

Preferably, electrochemical cell 28 is substantially smaller, for example, about 25%-50% smaller, than prior art electrochemical cells, particularly if boron-doped diamond electrodes are used in the making of the electrochemical cell as the maximum current loading for diamond electrodes is up to 6× higher than conventional RuO coated titanium electrodes. The pulse width and amplitude of the DC current is used to modify the composition and concentration of the mixed oxidants or reductants generated on the electrodes. For example, in one particularly advantageous embodiment, pump 20 is a relatively small, for example a 1/15 horsepower pump. The size and low power requirements of this embodiment allow the apparatus to be economically operated on a substantially continuous basis, or for an extended period of time, thereby providing long term, continuous water treatment of water in a pool, spa, fountain, water supply or other water feature.

The small size of electrochemical cell 28, which is made possible by the fact that much oxidizing and sanitizing activity is performed by enhanced amounts and concentrations of mixed oxidants brought about via the injection of precursor compounds and generated by electrochemical cell 28, is particularly advantageous in that all of, or substantially all of, the components of apparatus 10 can be packaged in a small, compact housing 16 that can conveniently be mounted by the side of the pool, spa, fountain, irrigation reservoir, industrial reservoir, water treatment reservoir, or the like.

In a preferred embodiment, apparatus 10 further comprises a control system including sensors 37, 41, 42 and a control unit 38. Sensors 37, 41, 42 may comprise any suitable sensors, preferably a quality electronic sensor, effective to monitor and/or measure a property of the water in contact therewith. Control unit 38 may comprise a microprocessor based control unit effective to regulate a property of the water passing through the apparatus based on a signal received from any of sensors 37, 41, 42. For example, control unit 38 may be operatively coupled to a component, for example, electrochemical cell power supply 34 and/or ultrasonic power supply 39, and/or ozone generator 26, and/or pump 20, and may be responsive to regulate the component in response to an input signal from sensor 37.

For example, sensor 37 may comprise a flow sensor mounted upstream of the chemical percursor injector 22. Control unit 38 may be configured to shut off or regulate power to pump 20, ozone generator 26 and/or electrochemical cell power supply 34 when sensor 37 indicates that flow has dropped below a predetermined level.

Apparatus 10 may further comprise a pH controller (not depicted) for example, integrated into control unit 38, configured to maintain a desired pH level in the water flowing through apparatus 10. For example, the pH controller unit is configured and located to release carbon dioxide gas, hydrochloric acid or other suitable agent from the precursor chemical carousel 29 into injector 22 by means of manifold system 45. The pH controller unit may also include a pH sensor 48, and be structured to regulate the addition of acid, for example, for maintaining a comfortable effective pH of about 7.2 in reservoir 40 being treated and preventing the downstream pH from dropping below about 6.5. With pH above about 6.5, wetted metal parts downstream of electrochemical cell 28 are not subject to a destructive corrosion rate.

Advantageously, the pH controller unit (preferably integrated into control unit 38) may be configured to be effective to create a continuous acidic wash in duct 36, the wash having a pH effective to reduce or eliminate scale buildup on the electrodes of electrochemical cell 28.

Water treatment apparatus 10 is structured such that with sufficient precursor chlorides chlorine is generated on the anode of electrochemical cell 28 while other oxidants are generated from a combination of ozone or molecular oxygen and hydrogen on the cathode. For average flow velocities, low current densities, and with the injection of chemical precursors such as ozone containing gas, or water from ozone generator 26 having an ozone concentration less than 100 ppm, the bi-polar cathode of cell 28 mostly produces the hydroxyl radical (OH), which immediately reacts with any organic compound or chloramines in the stream. For average flow velocities, low current densities, and air/water injection with ozone concentrations greater than 100 ppm, a high ozone concentration will be left in the water and the cathode-generated hydrogen will make both the hydroxyl radical (OH) and the hydroperoxyl radical ($HO_2$). The hydroperoxyl radical can react with water ($H_2O$) to form the hydroxyl radical (OH) and hydrogen peroxide ($H_2O_2$). For high concentrations of ozone-containing water or gas passed into electrochemical cell 28, a high ozone concentration residual will be left in the water, and the cathode-generated hydrogen will make both the hydroxyl radical (OH) and the hydroperoxyl radical (HO2) and some trace chlorine dioxide (ClO2) generated on the anode at high current densities. Some of the ozone also reacts with the water to make hydrogen peroxide (H2O2).

For example, in use in a swimming pool, control unit 38 can be used to create a water stream passing from the pool into apparatus 10 to achieve a high mixed oxidant concentration in order to cause rapid oxidation of organic loads. As the ORP reading approaches a set point, the chemical precursor volume and/or concentrations can be reduced to maximize chlorine residual in the water at a set point turn off. Control unit 38 may also be coupled to water quality sensor 41 for monitoring the quality of water in reservoir 40. Control unit 38 may include a regulator (not depicted) for automatically varying power to electrochemical cell 28 as needed to maintain the water quality at a desired level. Water quality sensor 41 may be, for instance, an ORP sensor for measuring the oxidizing activity of the water. Other sensors suitable for measuring or monitoring properties such as the pH or chlorine concentration of the water could also be used instead of, or in addition to, an ORP sensor.

Figure 1A:
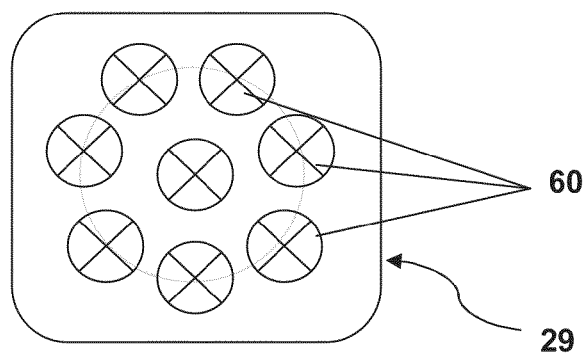
FIG. 1(a) is a schematic diagram showing a top view of the precursor chemical carousel device that holds cartridges, bottles, or compressed gas cylinders as feed stocks to the electrochemical cell(s).

Referring now to FIG. 1a., a top view of precursor chemical carousel 29 used in water treatment apparatus 10 of FIG. 1 is depicted, and any number of precursor compounds can be stored as replenishable cartridges 60 in the body of apparatus 10 as liquids, gases or dissolvable solids. In accordance with the present invention, cartridges 60 may include any and all precursor compounds to be used for enhancement of water quality, for enhancement of advanced oxidation processes, and for enhanced disinfection and organics destruction. Accordingly, precursor chemical cartridges 60 could contain, for example, hydrogen peroxide, hydrochloric acid, peroxyacids, halogen salts, ozone, sulphate salts, oxygen, nitrogen, ammonia, sodium bisulfide and bisulfite salts, bicarbonate salts, sulfur dioxide and the like.

Figure 1B:
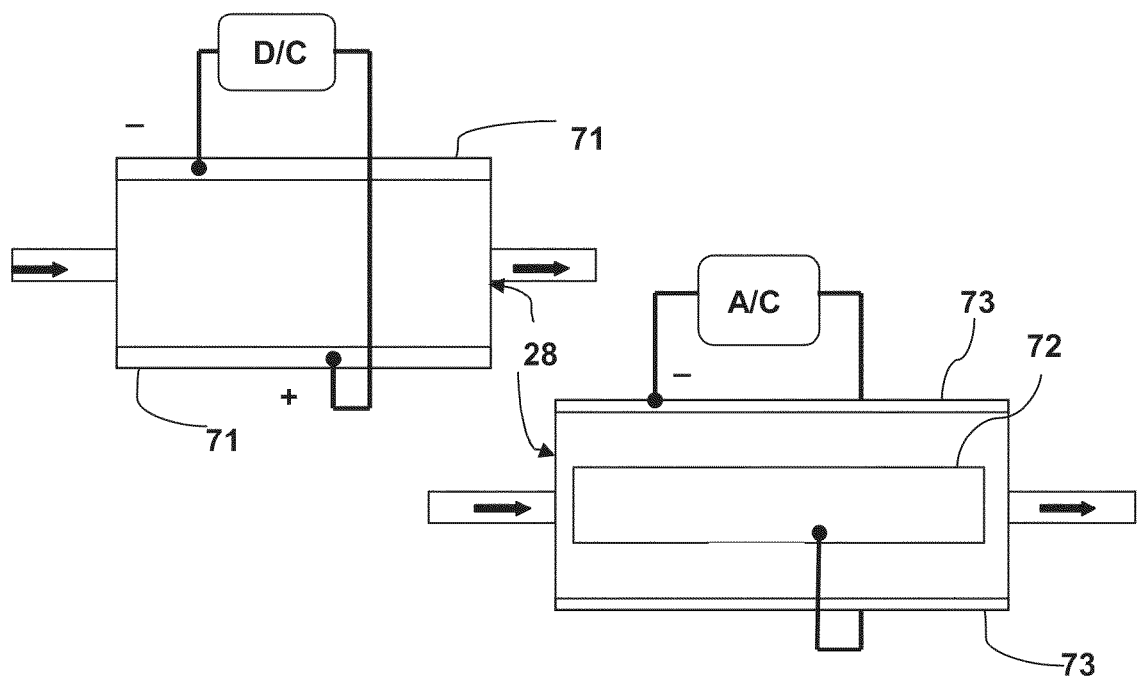
FIG. 1(b) is a schematic diagram showing a profile view of the electrochemical cell that demonstrates that the electrochemical cell can be either composed of various types of electrodes, or composed of ultraviolet (UV) lamps operated as virtual anodes and related rods or the sides of the treatment chambers acting as cathodes, to constitute an electrolytic device and an electrochemical cell.

FIG. 1b. depicts a schematic of electrochemical cell 28 in accordance with the present invention, as depicted in FIG. 1, composed of either various electrodes 71, for example boron-doped diamond sheets, or ultraviolet (UV) lamps operated as virtual anodes 72 with the housing acting as a cathode surface 73 in its simplest form as a monopolar cell. The pulse width and amplitude of the DC current is used to create the virtual cathode or anode charge on the lamp surface. In this embodiment, the pulsed direct current is passed through an electrolytic coating (such as boron-doped diamond, iridium oxide, titanium sub-oxide, doped aluminum oxide, doped silicon oxide, platinum metal, silica carbide, and tantalum carbide) deposited directly on the UV lamp's quartz surface to generate an anode charge on the surface whereupon the low pH condition that exists at the surface of the UV lamp prevents scaling or fouling of the UV lamp. The UV light is then used for multiple simultaneous purposes, such as disinfection, photolysis and advanced oxidation. The UV light is used to enhance the reaction rates of aqueous contaminant destruction, to destroy chloramines, to reduce pathogen levels, to convert elemental mercury to mercury oxide, and to generate hydroxyl radicals and other mixed-oxidants. Modulation of the UV output and/or pulsed current through the electrolytic coating is also included according to the water treatment demands. UV mercury lamps can be used to oxidize elemental mercury to mercury oxide for removal as a solid precipitate.

Figure 1C:
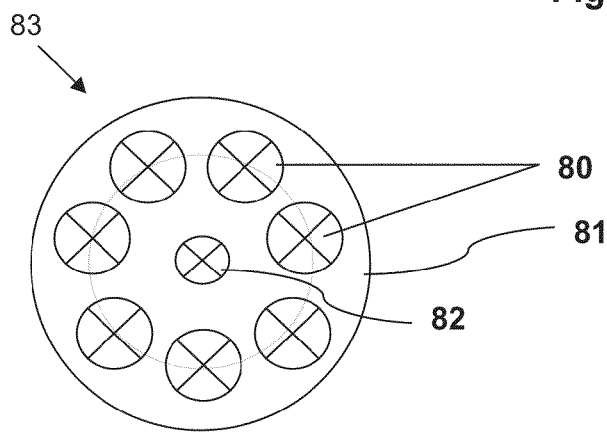
FIG. 1(c) is a schematic diagram showing a profile view of the virtual anode and cathode configuration of a UV lamp cluster to demonstrate how multiple UV lamp can be configured and operated so as to both disinfect and be used as an advanced oxidation process generator.

FIG. 1c. depicts the UV lamp-based electrochemical cell 28 referenced in FIG. 1 and the water treatment apparatus 10 in accordance with the present invention but with a group of UV lamps 80, rather than a single UV lamp, as would be typical in a larger installation or for treatment of the full flow of water or a significant side flow. FIG. 1c. depicts the end view of a typical UV reactor 83, familiar to those skilled in the art of UV system design, that can be operated as an electrochemical cell when UV lamps 80 are operated as virtual anodes and the body 81 of the UV reactor 83 and conductive rods placed within the core 82 of the reactor 83 constitute the cathode(s) of electrochemical cell 28. Megahertz ultrasound can be used to enhance the photochemical reactions.

Figure 2:
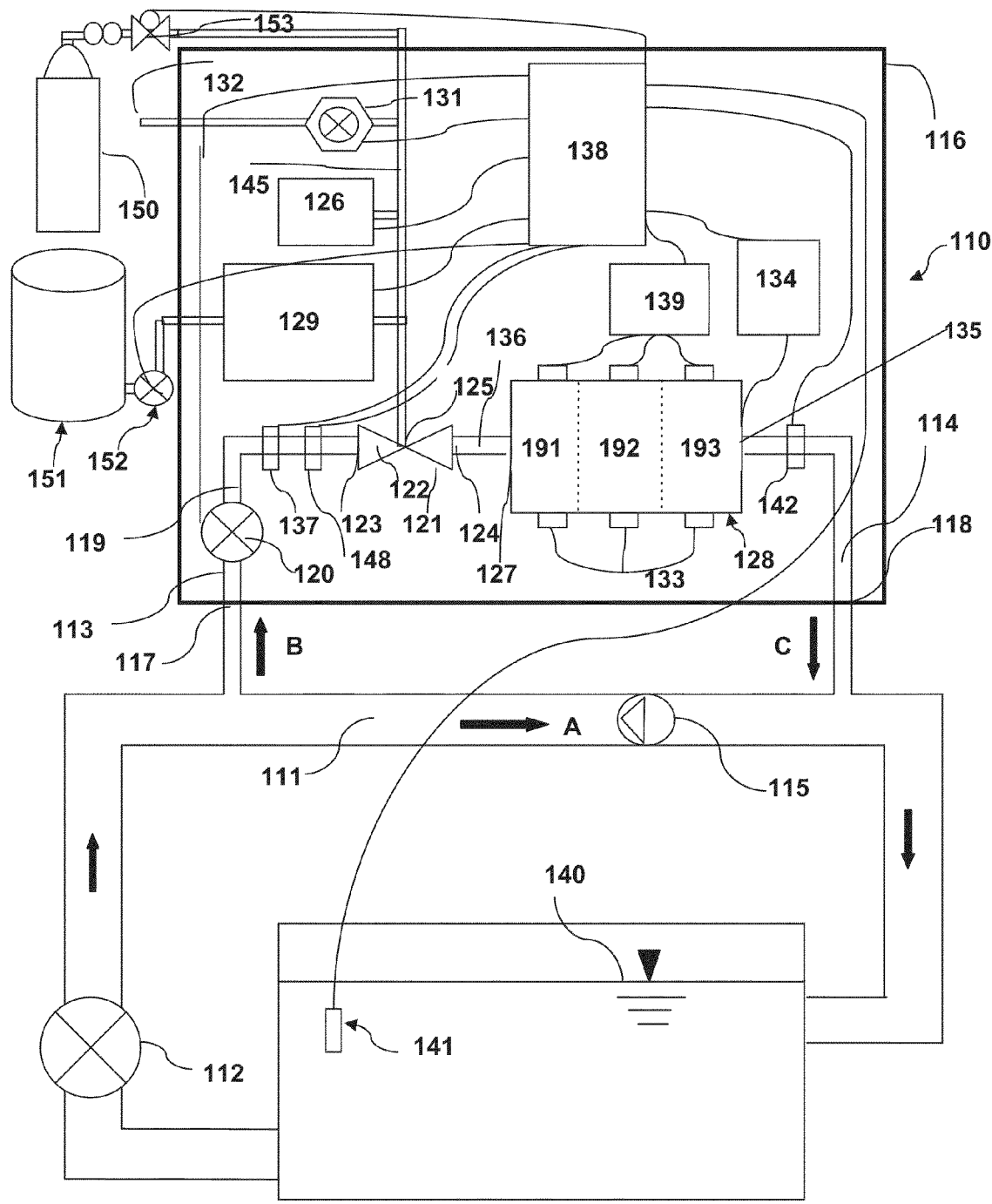

FIG. 2 shows another water treatment apparatus 110 in accordance with the present invention. Except as expressly described herein, apparatus 110 is similar to apparatus 10, and features of apparatus 110 which correspond to features of apparatus 10 are designated by the corresponding reference numerals increased by 100.

In this FIG. 2 embodiment, the water treatment apparatus is designed to be used for treatment of larger volumes of water, or more complicated treatment processes where larger volumes of precursor compounds are required and it is not practical to feed the electrochemical cell 28 from the chemical precursor carousel 129. In this embodiment the precursor compounds are fed from bulk storage feed stocks such as bulk gases 150 via an automatic valve 153 controlled by the system controller 138, and/or bulk liquids 151 which may include use of a pump 152 controlled by system controller 138 into the chemical precursor manifold 145 for transport to the injection system 122. Bulk gases for example could include argon, nitrogen, ozone, oxygen, nitrogen, sulfur dioxide, carbon dioxide, carbon monoxide, ammonia, and the like. Bulk liquids for example could include concentrated brine, chelating agents, liquid ammonia, chlorine, hydrogen peroxide, hydrochloric acid, peroxyacids, halogen salts, sulphate salts, ammonia, sodium bisulfide and bisulfite salts, bicarbonate salts and the like.

Figure 3:
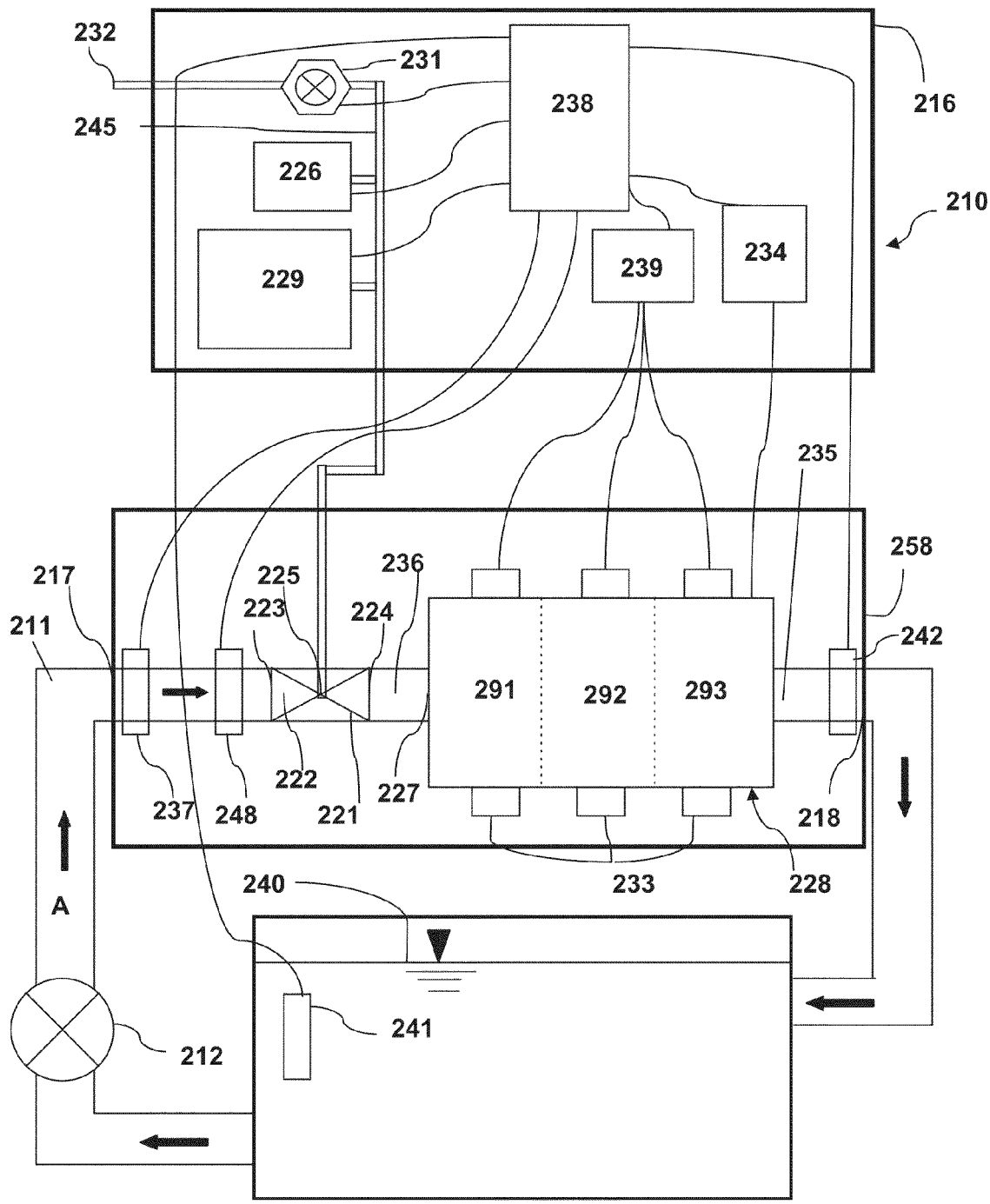

FIG. 3. shows another water treatment apparatus 210 in accordance with the present invention. Except as expressly described herein, apparatus 210 is similar to apparatus 10, and features of apparatus 210 which correspond to features of apparatus 10 are designated by the corresponding reference numerals increased by 200. In this embodiment, the bypass lines (13 and 14 of FIG. 1) have been eliminated, and a chemical precursor injector 222 and an electrochemical cell 228 are mounted directly in the main conduit 211 of the reservoir 240 circulation system. Water, powered by a pump 212 in line 211, enters the injector housing 221 through inlet 223, and enters the chemical precursor injector 222. Water passing through chemical precursor injector 222 enters electrochemical cell 228 via the precursor-laden water inlet 237. The mixed oxidants produced in electrochemical cell 228 then exit electrochemical cell 228 through the cell water outlet 235, and continue toward reservoir 240 via main conduit 211. As in the previous embodiment, a flow sensor 237 may be provided upstream of the chemical precursor injector 222 for monitoring flow through the system and shutting off power to the electrolytic chlorinator (electrochemical cell 228) when the flow drops below a predetermined level. In this embodiment there may be a separate housing 258 for sensors 237, 248, 242 and the precursor injector housing 221 and electrochemical cell 228 complete with ultrasonic transducers 233 depending on the proximity of system control unit 238 to main conduit 211. The electrochemical zones 291, 292, 293 are defined by their respective ultrasonic zones of influence. The pulse width and amplitude of the DC current is used to modify the composition and concentration of the mixed oxidants or reductants generated on the electrodes. In FIG. 3. there are three ultrasonic transducers 233 attached to electrochemical cell(s) 228 and therefore there are three individual and unique water or water treatment zones within the electrochemical cell 228. Each of these ultrasonic transducers may be operated at discrete frequencies, or combinations of frequencies, in the kHz and MHz ranges, or in sweep frequency mode in the kHz or MHz range in the current invention. There could be any number of such unique treatment zones employed in the current invention. For simplicity three zones are shown in FIG. 3.

Chemical precursors for the chemical precursor injector 222 are supplied through a precursor manifold 245 leading from an ozone generator 226 and/or the precursor chemical carousel 229, and/or air via the air pump 231 that takes in outside air at inlet 232. Ozone generator 226 is replaced by an atomic nitrogen, sulfur dioxide, atomic hydrogen, or amogen generator, or the like for reductive reactions in electrochemical cell 228.

Apparatus 210 preferably also includes a control system 238 for example, contained within housing 216 for controlling various aspects of the water treatment system. For instance, control unit 238 is preferably coupled to both flow sensor 237 and power supply 234 of electrochemical cell 228, causing electrochemical cell 228 to shut off automatically when the flow falls below a predetermined or safe level.

Control unit 238 may also be coupled to a water quality sensor 241 for monitoring the quality of water in reservoir 240. Control unit 238 may include a regulator (not depicted) for automatically varying power to electrochemical cell 228 as needed to maintain the water quality at a desired level. Water quality sensor 241 may be, for instance, an ORP sensor for measuring the oxidizing activity of the water. Other sensors suitable for measuring or monitoring properties such as the pH or chlorine concentration of the water could also be used instead of, or in addition to, an ORP sensor.

Figure 4:
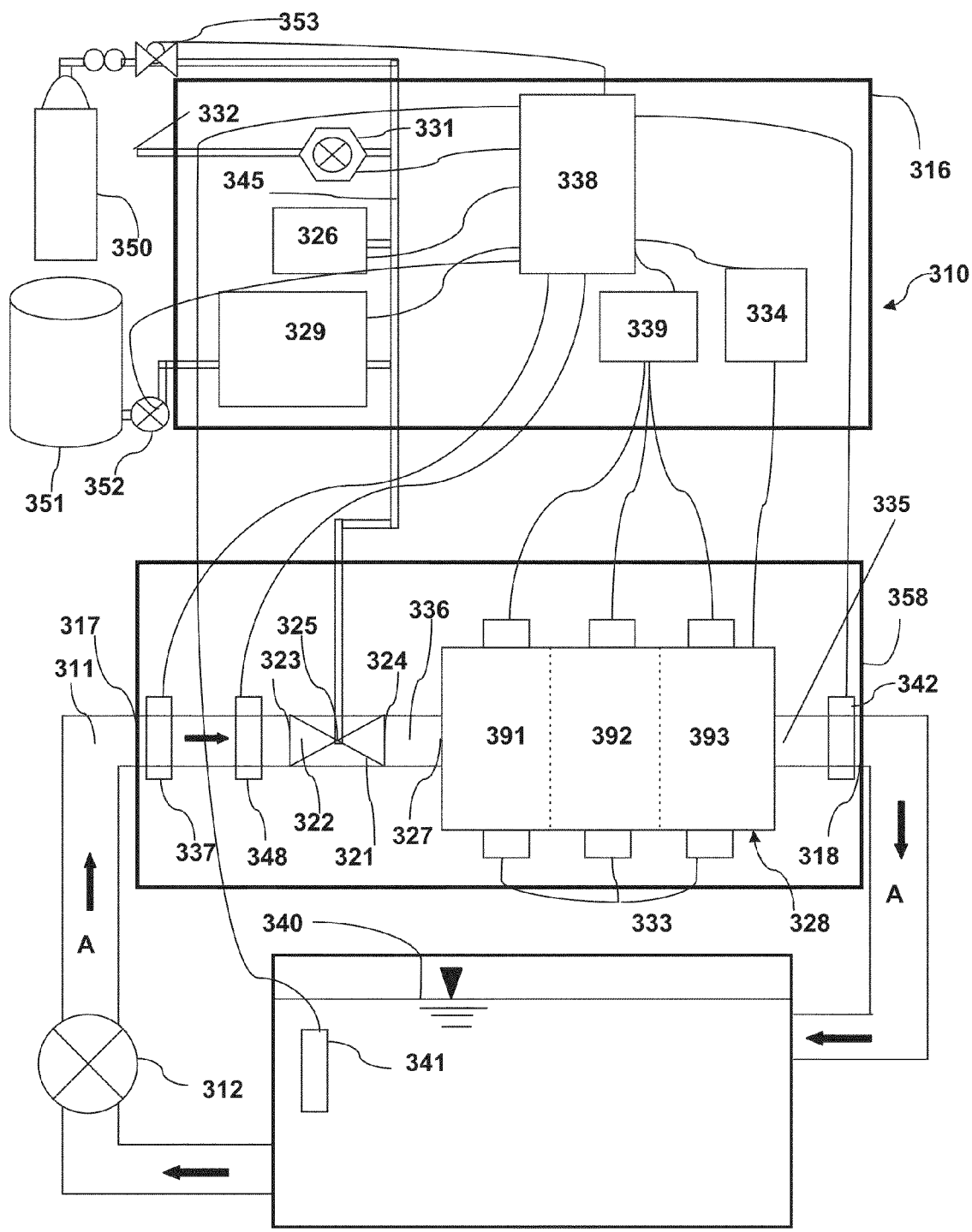

FIG. 4. shows a further water treatment apparatus 310 in accordance with the present invention. Except as expressly described herein, system 310 is similar to apparatus 10, and features of apparatus 310 which correspond to features of system 10 are designated by the corresponding reference numerals increased by 300.

In this embodiment, water treatment apparatus 310 is designed to be used for treatment of larger volumes of water, or more complicated treatment processes where larger volumes of precursor compounds are required and it is not practical to feed electrochemical cell 328 from the chemical precursor carousel 329. In this embodiment the precursor compounds are fed from bulk storage feed stocks such as bulk gases 350 via an automatic valve 353 controlled by the system control unit 338, and/or bulk liquids 351 which may include use of a pump 352 controlled by system control unit 338 into the chemical precursor manifold 345 for transport to the injection system 322. Bulk gases for example could include argon, nitrogen, ozone, oxygen, ammonia, and the like. Bulk liquids for example could include concentrated brine, chelating agents, liquid ammonia, chlorine, hydrogen peroxide, hydrochloric acid, peroxyacids, halogen salts, sulphate salts, ammonia, sodium bisulfide and bisulfite salts, bicarbonate salts and the like.

Figure 5:
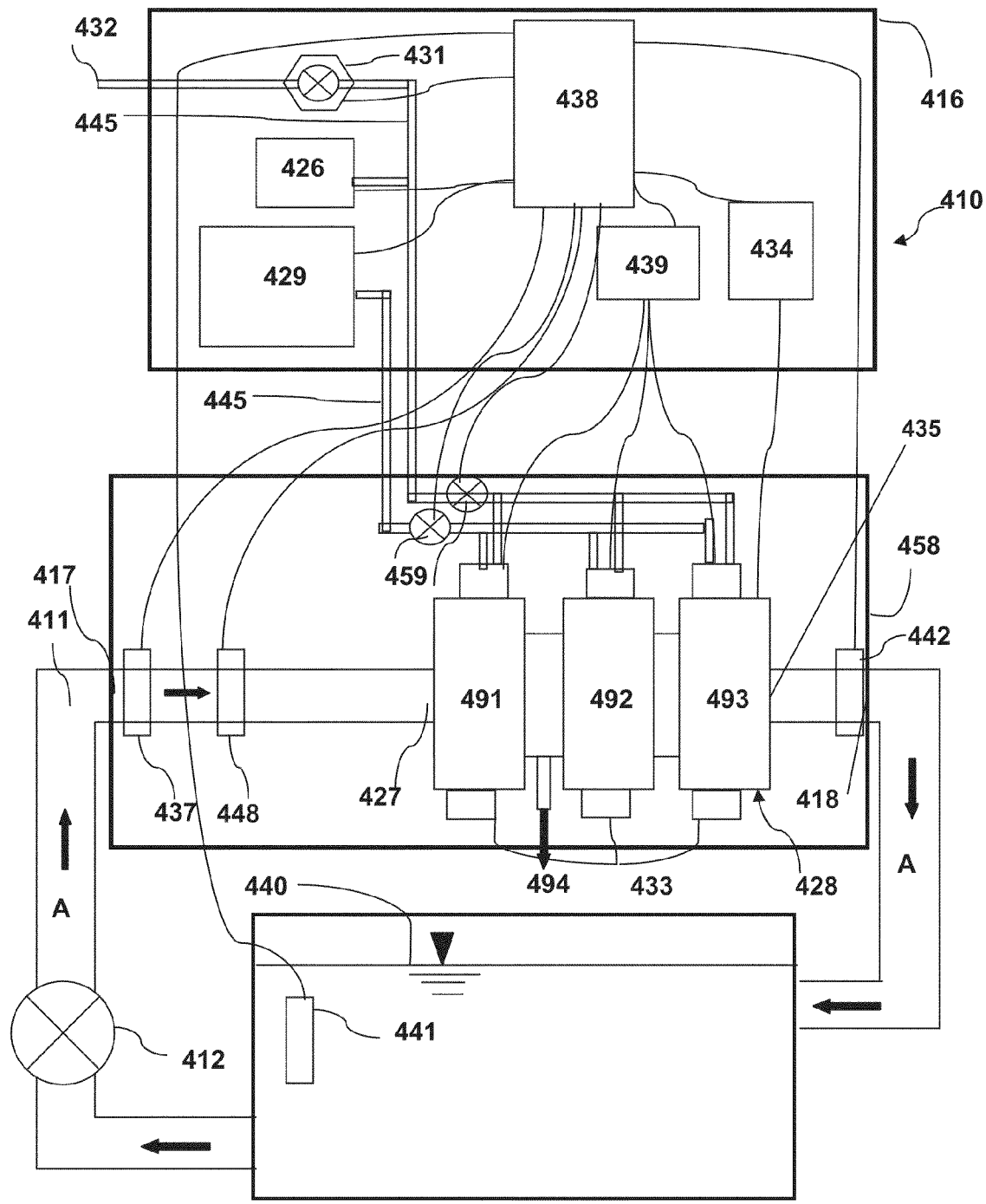

FIG. 5. shows another water treatment apparatus 410 in accordance with the present invention. Except as expressly described herein, apparatus 410 is similar to apparatus 10, and features of apparatus 410 which correspond to features of apparatus 10 are designated by the corresponding reference numerals increased by 400. In this embodiment, the bypass lines (13 and 14 of FIG. 1) have been eliminated, the chemical precursor injector (322 of FIG. 4) has been eliminated, and an electrochemical cell 428 is mounted directly in the main conduit 411 of the reservoir 440 circulation system. In this embodiment the precursor compounds are injected via pump 459 into the electrochemical cell zones 491-493 directly. The electrochemical zones 491, 492, 493 are defined by their respective ultrasonic zones of influence. The pulse width and amplitude of the DC current is used to modify the composition and concentration of the mixed oxidants or reductants generated on the electrodes in each respective zone. Electrochemical cell zone 491 may be used to precipitate metals, salts, hardness, organics and the like which are then removed from the cell at exit point 494. Electrochemical cell zone 493 may also be configured as a UV polishing zone for the treatment process. In FIG. 5. there are three ultrasonic transducers 433 attached to the electrochemical cell(s) and therefore there are three individual and unique water, or water treatment zones within the electrochemical cell, or series of cells. Each of these ultrasonic transducers may be operated at discrete frequencies, or combinations of frequencies, in the kHz and MHz ranges, or in sweep frequency mode in the kHz or MHz range in the current invention. There could be any number of such unique treatment zones employed in the current invention. For simplicity three zones are shown in FIG. 5. Water, powered by a pump 412 in line 411, enters electrochemical cell 428 through inlet 427.

Precursor compounds originating from chemical precursor carousel 429, and/or ozone generator 426, and/or air via the air pump 431 using ambient air inlet 432 are transported along chemical precursor manifold 445 and pumped via pump 459 directly into electrochemical cell 428. The mixed oxidants produced in electrochemical cell 428 then exit electrochemical cell 428 through the cell water outlet 435, and continue toward reservoir 440 via main conduit 411. As in the previous embodiment, a flow sensor 437 may be provided upstream of electrochemical cell 428 for monitoring flow through the system and shutting off power to electrochemical cell 428 when the flow drops below a predetermined level. In this embodiment there may be a separate housing 458 for the sensors 437, 448, 442 and electrochemical cell 428 complete with ultrasonic transducers 433, depending on the proximity of control unit 438 to main conduit 411.

Control unit 438 may also be coupled to a water quality sensor 441 for monitoring the quality of water in reservoir 440. Control unit 438 may include a regulator for automatically varying power to electrochemical cell 428 as needed to maintain the water quality at a desired level. Water quality sensor 441 may be, for instance, an ORP sensor for measuring the oxidizing activity of the water. Other sensors suitable for measuring or monitoring properties such as the pH or chlorine concentration of the water could also be used instead of, or in addition to, an ORP sensor.

Figure 6:
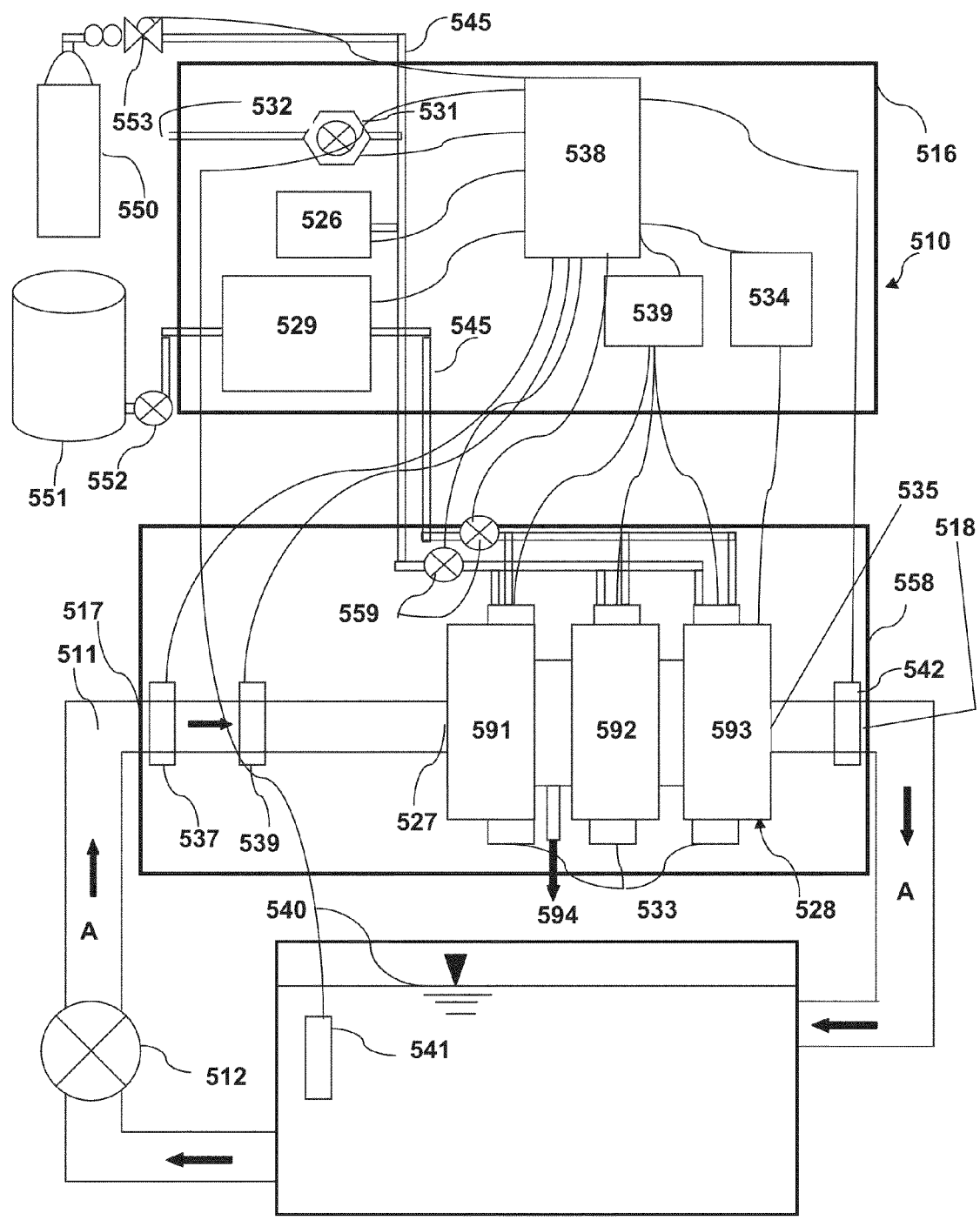

FIG. 6. shows a further water treatment apparatus 510 in accordance with the present invention. Except as expressly described herein, system 510 is similar to apparatus 10, and features of apparatus 510 which correspond to features of system 10 are designated by the corresponding reference numerals increased by 500.

In this embodiment, water treatment apparatus 510 is designed to be used for treatment of larger volumes of water, or more complicated treatment processes where larger volumes of precursor compounds are required and it is not practical to feed the electrochemical cell 528 from the chemical precursor carousel 529. In this embodiment the precursor compounds are fed from bulk storage feed stocks such as bulk gases 550 via an automatic valve 553 controlled by the system control unit 538, and/or bulk liquids 551 which may include use of a pump 552 controlled by system control unit 538 into the chemical precursor manifold 545. Bulk gases for example could include argon, nitrogen, ozone, oxygen, ammonia, and the like. Bulk liquids for example could include concentrated brine, chelating agents, liquid ammonia, chlorine, ozone, hydrogen peroxide, halogen salts and the like. Individual electrochemical treatment zones are designed into the current invention for precipitation, flocculation, oxidation, or reduction processes.

In this embodiment the precursor compounds are injected via pumps 559 into the electrochemical cell zones 591-593 directly. Electrochemical zones 591, 592, 593 are defined by their respective ultrasonic zones of influence. In FIG. 6. there are three ultrasonic transducers 533 attached to the electrochemical cell(s) 528 and therefore there are three individual and unique water or water treatment zones within the electrochemical cell 528, or series of cells. The electrochemical zones 591-593 are separated to enhance the desired reaction within cell 528. Each of these ultrasonic transducers 533 may be operated at discrete frequencies, or combinations of frequencies, in the kHz and MHz ranges, or in sweep frequency mode in the kHz or MHz range in the current invention. There could be any number of such unique treatment zones employed in the current invention. For simplicity FIG. 6. shows three such zones. Water, powered by a pump 512 in line 511, enters electrochemical cell 528 through inlet 527.

Precursor compounds originating from the bulk storage feed stocks such as bulk gases 550 via automatic valve 553 controlled by system control unit 538, and/or bulk liquids 551 which may include use of a pump 552 controlled by the system control unit 538, and/or the ozone generator 526, and/or air via air pump 531 using ambient air inlet 532 are transported along chemical precursor manifold 545 and pumped via pump 559 directly into electrochemical cell 528. The mixed oxidants produced in electrochemical cell 528 then exit electrochemical cell 528 through the cell water outlet 535, and continue toward reservoir 540 via main conduit 511. As in the previous embodiment, a flow sensor 537 may be provided upstream of electrochemical cell 528 for monitoring flow through the system and shutting off power to electrochemical cell 528 when the flow drops below a predetermined level. In this embodiment there may be a separate housing 558 for the sensors 537, 548, 542 and electrochemical cell 528 complete with the ultrasonic transducers 533 depending on the proximity of control unit 538 to main conduit 511.

Control unit 538 may also be coupled to a water quality sensor 541 for monitoring the quality of water in reservoir 540. Control unit 538 may include a regulator for automatically varying power to electrochemical cell 528 as needed to maintain the water quality at a desired level. Water quality sensor 541 may be, for instance, an ORP sensor for measuring the oxidizing, or reducing activity of the water. Other sensors suitable for measuring or monitoring properties such as the pH or chlorine concentration of the water could also be used instead of, or in addition to, an ORP sensor.

Advantageously, apparatus 510 in accordance with the present invention is structured to be highly effective in producing an aqueous mixture having an increased or enhanced biocidal activity, for example, relative to an identical apparatus without the inclusion of precursor compounds. Without wishing to be limited by any particular theory of operation, by oxygenating the water passed to electrochemical cell 528 via the injection of air/oxygen from inlet 532 and substantially maintaining the water in the oxygenated state while the water is introduced to the electrolytic device, the electrolytic activity in the water causes increased chemical reactions in the water that more effectively produce biocidally active materials or species, for example, higher concentrations of one or more oxidants, and/or more varieties of different oxidants, than are produced without the water being oxygenated and substantially maintained in the oxygenated state. Ozone generator 526 is replaced by an atomic nitrogen, atomic hydrogen, sulfur dioxide, or amogen generator, or the like for reductive reactions in electrochemical cell 528.

The addition of a salt, for example, a halite salt, for example, sodium chloride and/or sodium bromide, to the water in apparatus 510, further enhances the production of biocidally active materials.

In some embodiments, the method includes utilizing a tank 551 to inject an acidic component or carbon dioxide gas 550 into the water in an amount effective to produce an acidic wash for electrochemical cell 528 and/or a super-oxidant level in the water exiting electrochemical cell 528.

The steps of withdrawing the stream from reservoir 540 and returning the stream to reservoir 540 may consist of simply pumping the stream through main conduit 511 of the reservoir's preexisting circulation system, or they may comprise diverting the stream from main conduit 511 into a secondary circulation system communicating with the pre-existing circulation system. In the former case, the steps of injecting chemical precursors into the stream and directing the stream through electrochemical cell 528 to generate mixed oxidants are performed within main conduit 511 itself. In the latter case, the steps of injecting chemical precursors into the stream of water and introducing the precursor-laden stream of water into electrochemical cell 528 occur within the secondary circulation system. The secondary circulation system including a secondary pump operates independently of the primary pump of the reservoir's circulation system, thus allowing 24-hour operation of the water treatment apparatus. Electrochemical cell zone 591 may be used to precipitate metals, salts, hardness, organics and the like which are then removed from the cell zone at exit point 594. Electrochemical cell zone 593 may also be configured as a UV polishing zone for the treatment process.

Figure 7:
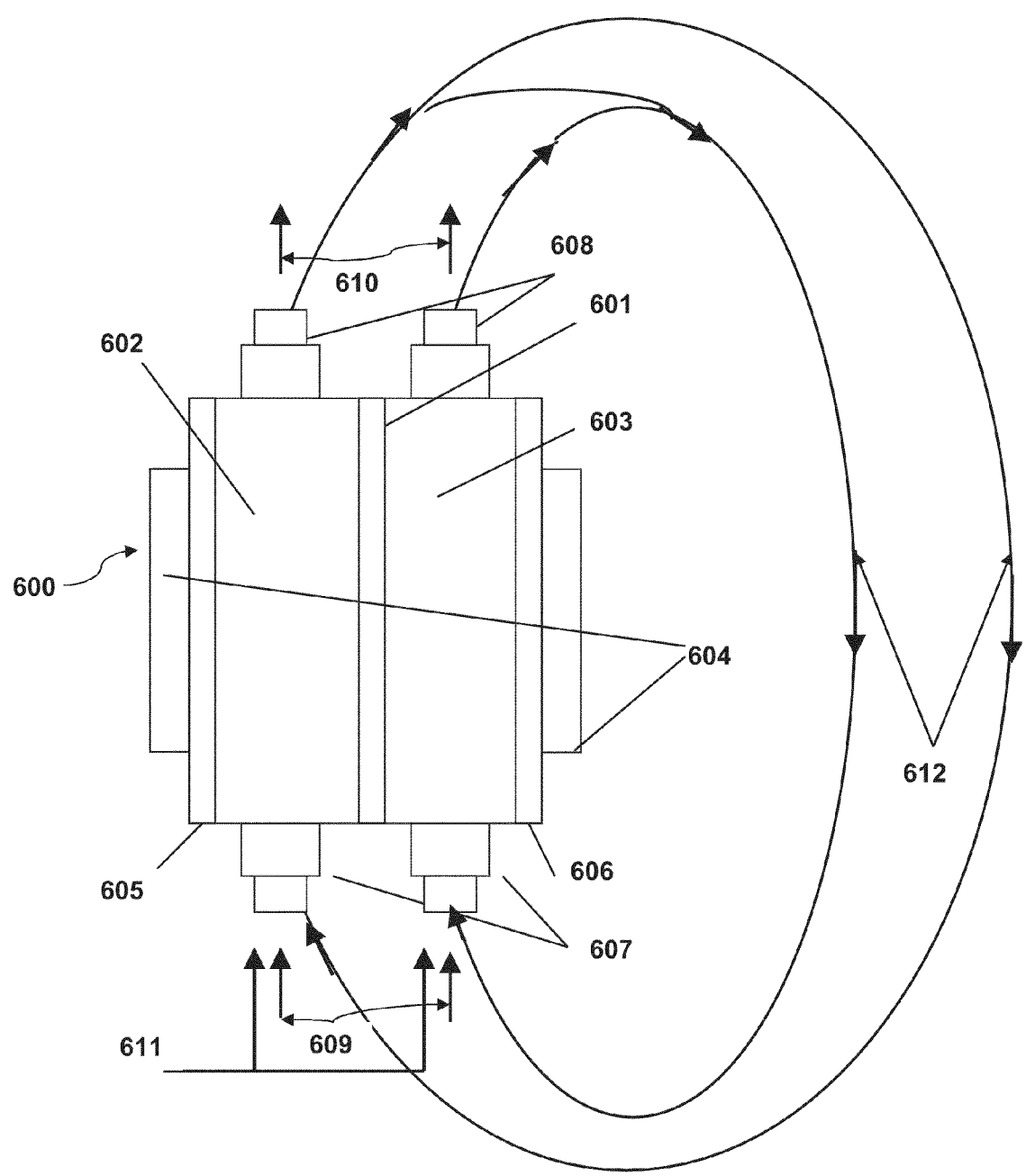
FIG. 7 is a schematic diagram showing another water treatment apparatus in accordance with the invention applied to the full, or partial flow of water and where precursor compounds are supplied to the flow to treat mid to high TDS water.

FIG. 7. shows a further water treatment apparatus 600 in accordance with the present invention and in the present example, for use with single or multiple cells, with proton exchange membranes (PEMs) 601, to treat a water with mid to high total dissolved solids (TDS) levels. In the current embodiment, the precursor feeds 611 are injected into the anoltye chamber 602 and catholyte chamber 603 of the electrolytic/electrochemical cell 615 via inlets 607 in addition to the water to be treated 609. Upon treatment in cell 615 the water exits cell 615 at out separated outlets 608 and then can be recycled 612 back through the anolyte chamber 602 or catholyte chamber 603 as desired to further treat the water stream 609. Electrolytic cell 615 further comprises ultrasonic tranducers 604, anode 605, and cathode 606.

Figure 8:
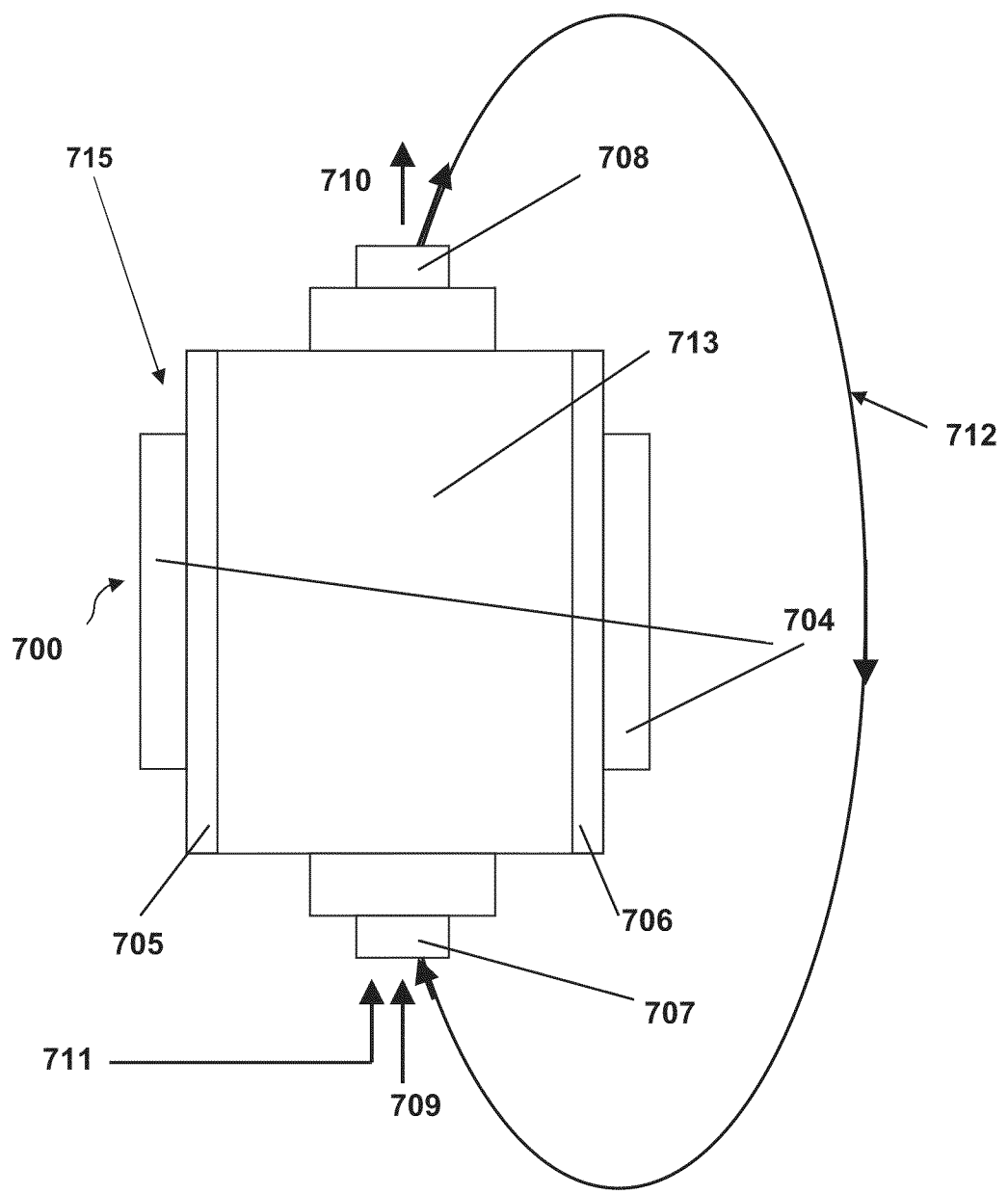
FIG. 8 is a schematic diagram showing another water treatment apparatus in accordance with the invention applied to the full, or partial flow of water and where precursor compounds are supplied to the flow to treat high TDS water

FIG. 8. shows a further water treatment apparatus 700 in accordance with the present invention and similar to that of FIG. 7, and in the present example, for use with single or multiple cells, without membranes, to treat a water with high total dissolved solids (TDS) levels. In the current embodiment, the precursor feeds 711 are injected into the electrochemical treatment chamber 713 of the electrolytic/electrochemical cell 715 in addition to the water 709 that is to be treated at inlet 707. Upon treatment in cell 715, the water 710 exits cell 715 at outlet 708 and then can be recycled 712 back through the electrochemical chamber 713 as desired to further treat water stream 709. Electrolytic cell 715 further comprises ultrasonic tranducers 704, anode 705, and cathode 706.

Figure 9:
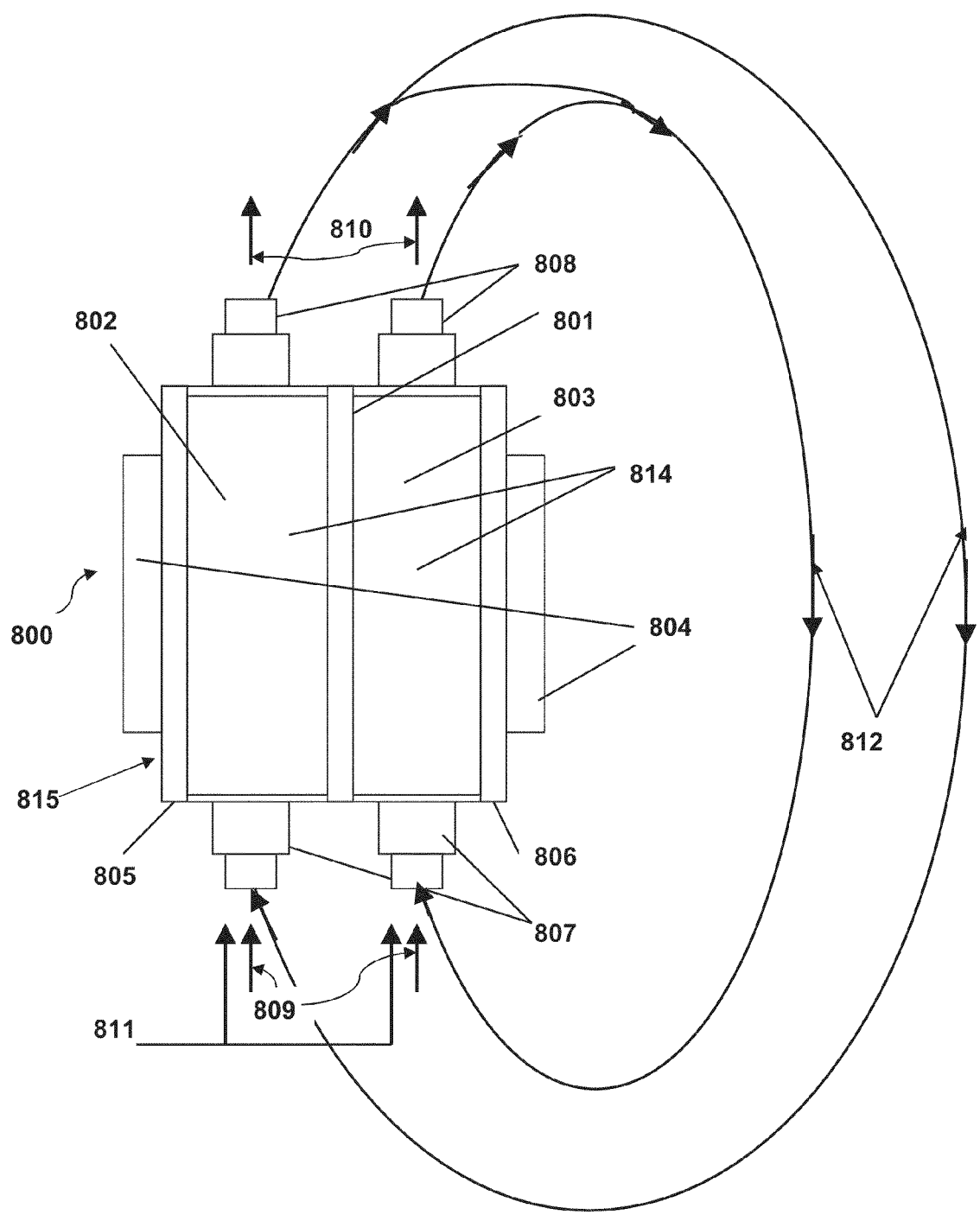
FIG. 9 is a schematic diagram showing another water treatment apparatus in accordance with the invention applied to the full, or partial flow of water and where precursor compounds are supplied to a single electrolytic/electrochemical cell with a proton exchange membrane and prill-resin for treatment of low TDS water.

FIG. 9. shows a further water treatment apparatus 800 in accordance with the present invention and similar to that of FIGS. 7 and 8, and in the present example, for use with single or multiple cells, with membranes 801 (PEM), to treat a water with low TDS levels and where a conductive prill-resin electrolyte 814 must be used. In the current embodiment, the precursor feeds 811 are injected into the anoltye chamber 802 and catholyte chamber 803 of the electrolytic/electrochemical cell 815 in addition to the water which is to be treated 809. Upon treatment in cell 815, the treated water 810 exits cell 815 at separated outlets 808 and then can be recycled 812 back through the anolyte chamber 802 or catholyte chamber 803 as desired to further treat water stream 809. Electrolytic cell 815 further comprises ultrasonic tranducers 804, anode 805, and cathode 806.

Figure 10:
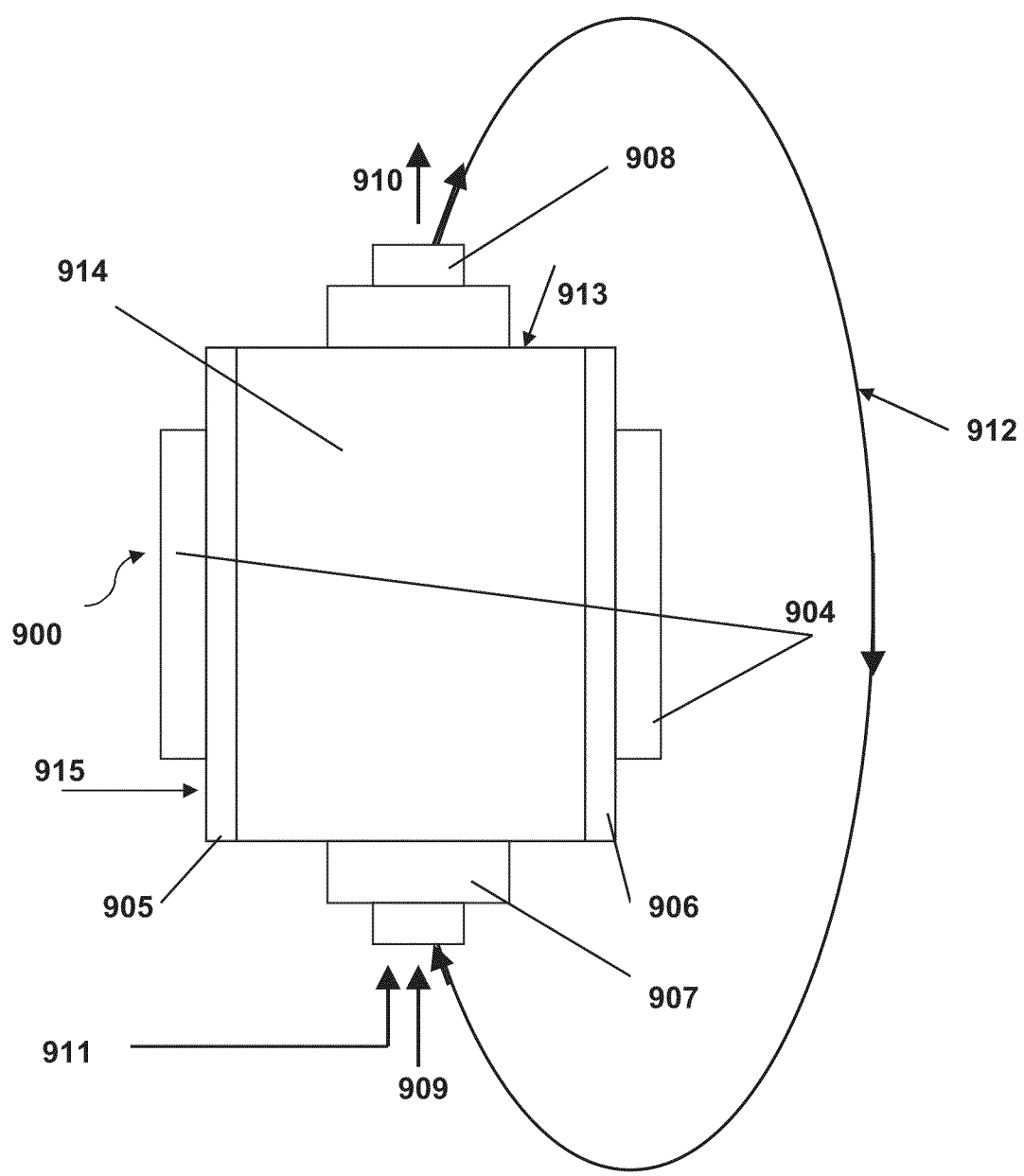
FIG. 10 is a schematic diagram showing another water treatment apparatus in accordance with the invention applied to the full, or partial flow of water and where precursor compounds are supplied to a single electrolytic/electrochemical cell with a proton exchange membrane and prill-resin for treatment of low TDS water.

FIG. 10. shows a further water treatment apparatus 900 in accordance with the present invention and similar to that of FIGS. 7-9, and in the present example, for use with single or multiple cells, without membranes, to treat a water 909 with low TDS levels and which contains a conductive prill-resin electrolyte 914. In the current embodiment, the precursor feeds 911 are injected into the electrochemical treatment chamber 913 of electrolytic/electrochemical cell 915 in addition to the water 909 that is to be treated at inlet 907. Upon treatment in cell 915 the treated water 910 exits cell 915 at outlet 908 and then can be recycled 912 back through the electrochemical chamber 913 as desired to further treat water stream 909. Electrolytic cell 915 further comprises ultrasonic tranducers 904, anode 905, and cathode 906.

Figure 11:
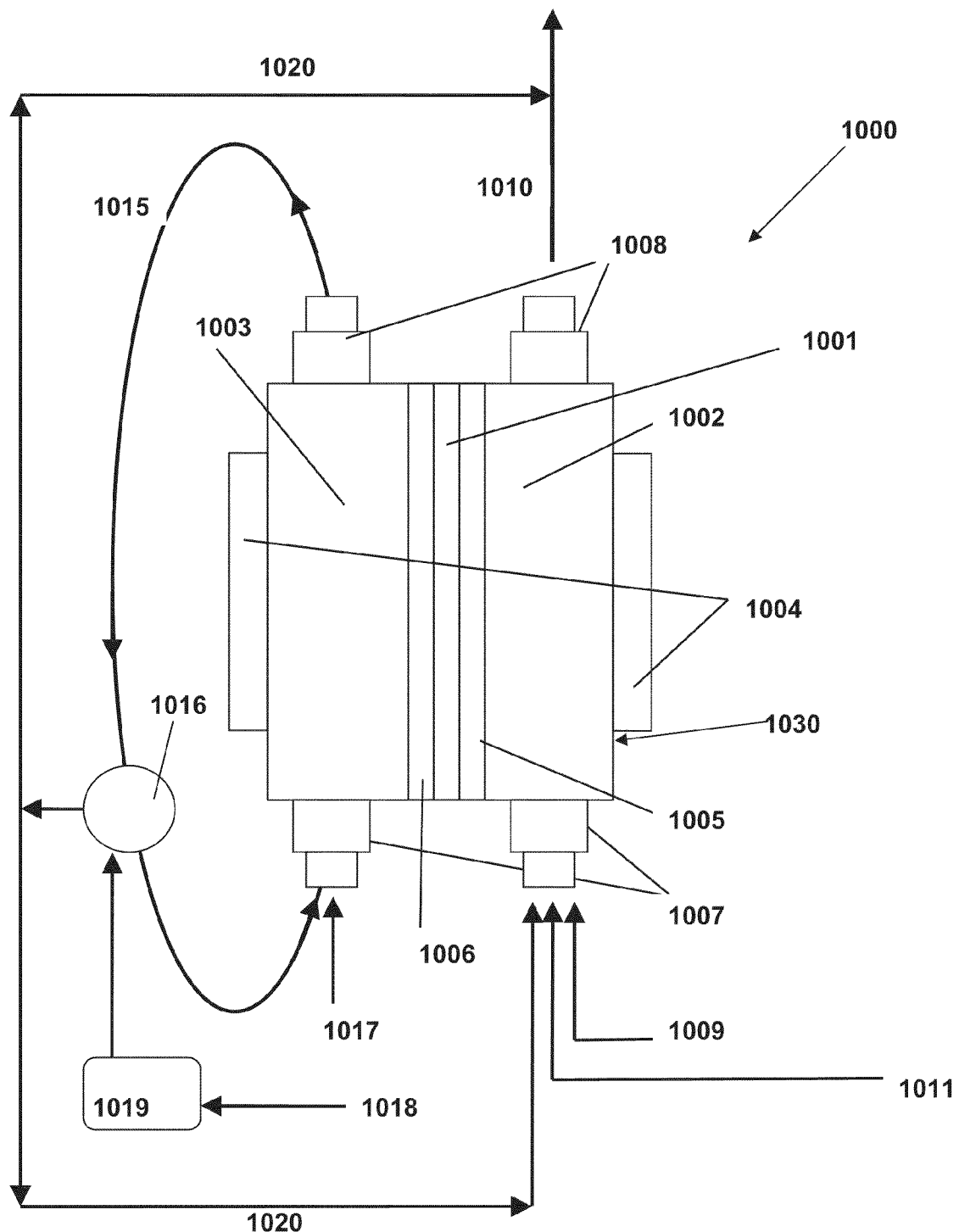
FIG. 11 is a schematic diagram showing another water treatment apparatus in accordance with the invention applied to the full, or partial flow of water and where precursor compounds are supplied to a zero gap electrolytic/electrochemical cell with a proton exchange membrane (PEM) for ultra-pure water oxidation.

FIG. 11. shows a further water treatment apparatus 1000, a zero gap electrolytic/electrochemical cell in accordance with the present invention, and in the present example for use with single or multiple cells, with a proton exchange membrane (PEM) 1001, to treat an ultrapure water with very low to no total dissolved solids (TDS), where complete disinfection of the treated water 1010 is required, and where a residual disinfectant is required to inhibit algae, or bacteria, or biofilm growth in the ultrapure water piping. The present invention is ideal for use in the semiconductor industry where ultrapure water is required for quality manufacturing. In the current embodiment, the precursor feeds 1011 are injected into the anoltye chamber 1002 and catholyte chamber 1003 of the electrolytic/electrochemical cell 1030 in addition to the water 1009 that is to be treated via inlet 1007. Upon treatment in cell 1030, the treated water 1010 exits cell 1030 at separated outlets 1008 for use. An additional version of the present invention is particularly advantageous in ultrapure applications in that the current invention can use a pure water closed loop 1015 which is constantly recycled through catholyte chamber 1003 to build up the concentration of hydrogen peroxide in tank 1016. Make up water 1018 to the pure water closed loop 1015 is first treated to a very high quality via the electrodeionization (EDI) cell 1019. Air, or oxygen, 1017 as a precursor material is injected into catholyte chamber 1003 to enhance the production of hydrogen peroxide in loop 1015. The produced hydrogen peroxide can be used 1020 as a precursor feed stock to anolyte chamber 1002 or for residual disinfection of the treated water 1010 post electrochemical treatment. Electrolytic cell 1030 further comprises ultrasonic tranducers 1004, BDDE/PbO perforated-porous anode 1005, and BDDE/Noble metal cathode 1006.

Figure 12:
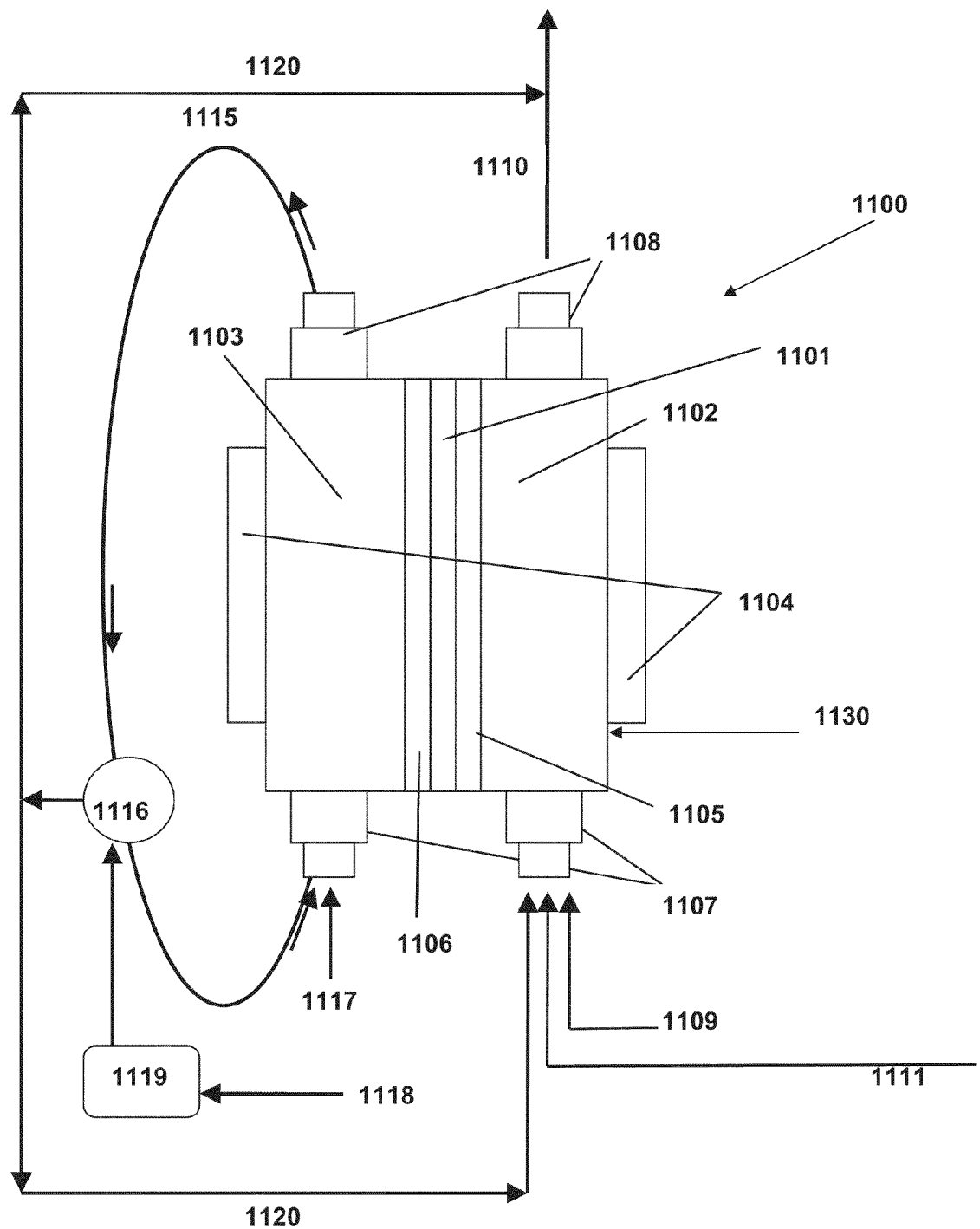
FIG. 12 is a schematic diagram showing another water treatment apparatus in accordance with the invention applied to the full, or partial flow of water and where precursor compounds are supplied to a zero gap electrolytic/electrochemical cell with a proton exchange membrane (PEM) for oxidation treatment of high organic concentrations in water or wastewater.

FIG. 12. shows a further water treatment apparatus 1100 (similar to apparatus 1000 of FIG. 11 with corresponding parts having a reference number increased by 100), a zero gap electrolytic/electrochemical cell 1130 in accordance with the present invention and in the present example, for use with single or multiple cells, with a proton exchange membrane 1101, to treat a water or wastewater stream with a total dissolved solids (TDS) range of approximately 500-4,000, where oxidation and disinfection of the treated water 1110 is required, and where a residual disinfectant is required to inhibit algae, or bacteria growth. The present invention is ideal for use in the water and wastewater industry where a membrane cell is used and cathode 1106 does not scale up or require constant acid washing. In the current embodiment, precursor feeds 1111 are injected into anoltye chamber 1102 and catholyte chamber 1103 of electrolytic/electrochemical cell 1130 in addition to the water 1109 that is to be treated. Upon treatment in the cell 1130, the treated water 1110 exits cell 1130 at separated outlets 1108 for use. An additional version of the present invention is particularly advantageous in water wastewater treatment applications in that the current invention can use a pure water closed loop 1115 which is constantly recycled through catholyte chamber 1103 to build up the concentration of hydrogen peroxide in tank 1116. Make up water 1118 to pure water closed loop is first treated to a very high quality via EDI cell 1119. Air, or oxygen, 1117 as a precursor material is injected into catholyte chamber 1103 to enhance the production of hydrogen peroxide in loop 1115. The produced hydrogen peroxide can be used 1120 as a precursor feed stock to anolyte chamber 1102 or for residual disinfection and oxidation of treated water 1110 post electrochemical treatment. Electrolytic cell 1130 further comprises ultrasonic tranducers 1104, BDDE/PbO perforated-porous anode 1105, and BDDE/Noble metal cathode 1106.

Figure 13:
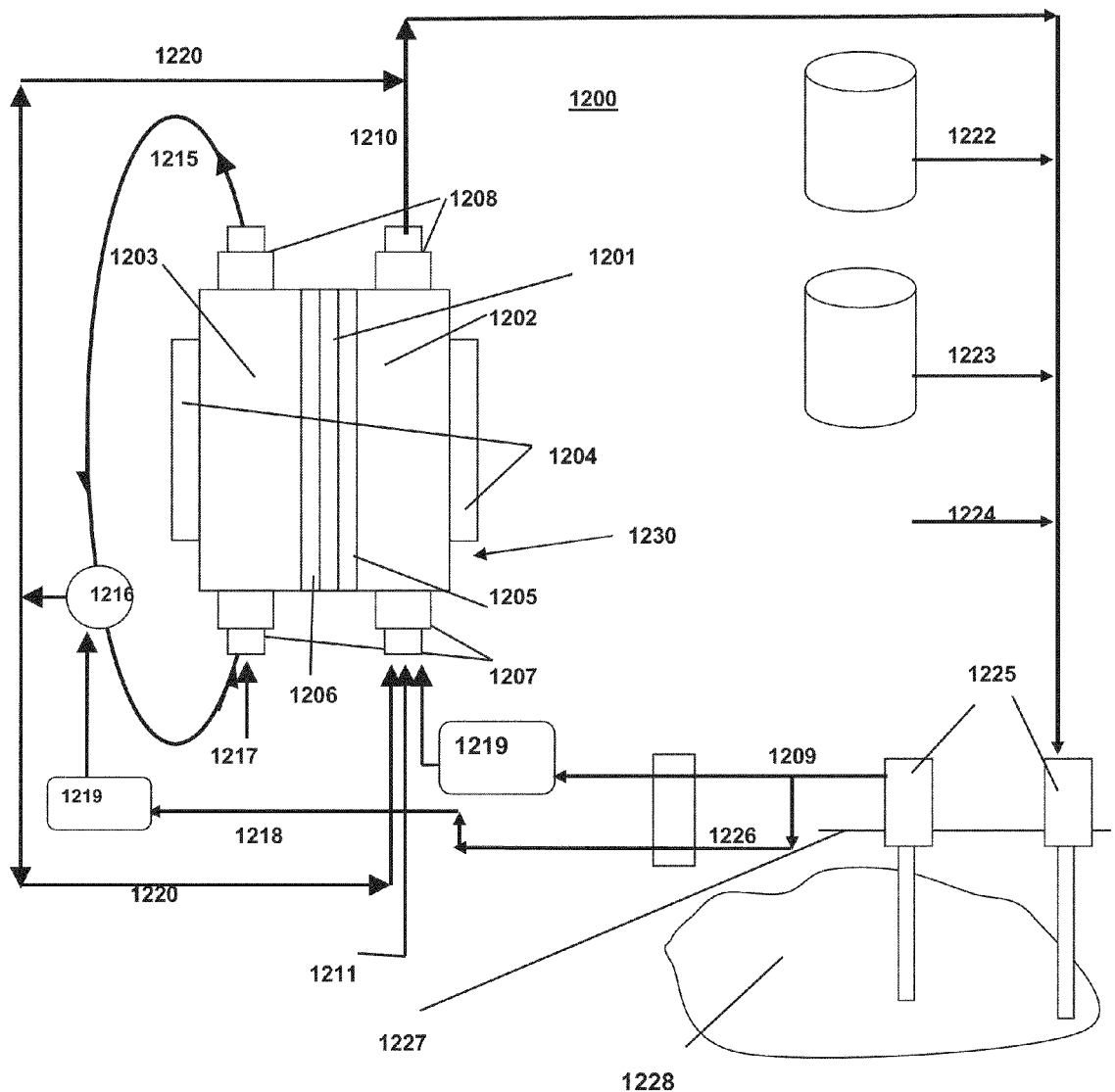
FIG. 13 is a schematic diagram showing another water treatment apparatus in accordance with the invention applied to the full, or partial flow of water and where precursor compounds are supplied to a electrolytic/electrochemical cell with a proton exchange membrane (PEM) as an advanced treatment process for non-aqueous phase liquid (NAPL) contaminants or other groundwater remediation processes and/or subsurface contaminant treatment process.

FIG. 13. shows a further water treatment apparatus 1200 (similar to that of apparatus 1100 of FIG. 12 with corresponding parts having a reference number increased by 100), a zero gap electrolytic/electrochemical cell 1230 in accordance with the present invention and in the present example, for use with single or multiple cells, with a proton exchange membrane (PEM) 1201, to treat a groundwater 1228 remediation stream where oxidation/reduction of the water 1209 is required. The present invention is ideal for use in oil and gas produced water cleanup and for ground water remediation projects where a membrane electrolytic/electrochemical cell is used to generate on-site oxidants/reductants to treat a contaminated stream and the membrane separated cathode does not scale up or require constant acid washing. In the current embodiment, precursor feeds 1211 are injected into anoltye chamber 1202 and catholyte chamber 1203 of electrolytic/electrochemical cell 1230 in addition to the water 1209 that is to be treated. Upon treatment in cell 1230, treated water 1210 exits cell 1230 at separated outlets 1208 for use. An additional version of the present invention is particularly advantageous in water and wastewater treatment applications in that the current invention can use a pure water closed loop 1215 which is constantly recycled through catholyte chamber 1203 to build up the concentration of hydrogen peroxide in tank 1216. Make up water 1218 to pure water closed loop 1215 is first treated to a very high quality via the electrodeionization (EDI) cell 1219. Air, or oxygen, 1217 as a precursor material is injected into catholyte chamber 1203 to enhance the production of hydrogen peroxide in loop 1215. The produced hydrogen peroxide can be used 1220 as a precursor feed stock to anolyte chamber 1202 or for residual disinfection and oxidation of treated water 1210 post electrochemical treatment. In the present invention, EDI pretreatment 1226 is possible on the recycle loop for a fully contained electrochemical groundwater remediation system. A preferential embodiment of the present invention is the flexibility afforded by the current implementation whereby varying the incoming chloride content via the use, or non-use of electrodeionization (EDI) it is possible to selectively determine the mixed oxidant composition chemistry (O3 and/or H2O2 and/or miexed oxidant products from electrolytic/electrochemical cell 1230 depending on precursors and chloride content into cell 1230) that is produced in anolyte chamber 1202. This custom mixed oxidant or mixed reductant solution is further conditioned by pH adjustment 1222, surfactant addition 1223, or air injection 1224 prior to being pumped 1225 below ground 1227 into treatment zone 1228. Contaminated groundwater 1209 to be remediated is pumped 1225 out of the treatment zone 1228 and is either sent once through EDI pretreatment process 1226 and on through an EDI cell 1219 and into anolyte chamber 1202 for treatment on a once through basis, or contaminated groundwater 1209 can be recycled any number of cycles through anolyte chamber 1202. Electrolytic cell 1230 further comprises ultrasonic tranducers 1204, BDDE/PbO perforated-porous anode 1205, and BDDE/Noble metal cathode 1206.

The present invention in one embodiment is for generating a customized oxidant or reductant mix in an electrochemical cell for treating water or aqueous solutions from a reservoir, said apparatus comprising: (a) an inlet operatively connected to said reservoir by a supply circulation system allowing the transport of said water or aqueous solution from said reservoir to said inlet, a pump for sending said water or aqueous solution through said electrochemical cell, said pump operatively connected to said inlet; (b) an injector assembly comprising a venturi injector, an inlet port operatively connected to said pump, a precursor inlet, and an outlet port, said outlet port operatively connected to a cell inlet of said electrochemical cell; (c) a manifold operatively connecting an ozone source, a source of at least one chemical precursor, and an air source to said precursor inlet of said injector assembly; (d) an variable power supply operatively connected to said electrochemical cell, said electrochemical cell including a cell outlet operatively connected to said supply circulation system; (e) a control system including a control unit in communication with at least one sensor for monitoring and generating at least one signal to said control unit based on at least one property of said water or aqueous solution, said at least one sensor located to operatively monitor said water or aqueous solution, said control unit including a microprocessor configured to regulate said at least one property in real-time response to said at least one signal; and (f) said control unit operatively connected to at least one component selected from the group of said pump, said ozone source, said source of at least one chemical precursor, said air source, and said variable power supply, said control unit configured to selectively regulate the power supplied to and the operation of any component of said at least one component group in real-time response to said at least one signal. The source of at least one chemical precursor may be adjusted to comprise any chemical precursors specifically desired for the treatment of said water or aqueous solution. The source of at least one chemical precursor can include a carousel holding one or more containers, each of said one or more containers holding a chemical precursor, said carousel operative to selectively deliver at least one chemical precursor to said manifold under the control of said control unit. The electrochemical cell can comprise at least one bipolar cell arranged in series. The at least one bipolar cell can include at least one ultrasonic transducer, each of said at least one ultrasonic transducers defining a respective ultrasonic zone of influence within said at least one bipolar cell, and said apparatus further comprises an ultrasonic power supply operatively connected to said at least one ultrasonic transducer and said control unit. The at least one ultrasonic transducer can operate at frequency ranges at or near 12 kHz to 70 kHz for cavitation, degassing, and/or mixing of said water or aqueous solution within said respective ultrasonic zone of influence and at or near 0.1 MHz to 1 MHz for hydroxyl generation within said respective ultrasonic zone of influence. The at least one bipolar cell can include an electrode having a dimensionally stable anode coating. The dimensionally stable anode coating may be selected from the group consisting of boron-doped diamond, iridium oxide, titanium sub-oxide, doped aluminum oxide, or doped silicon oxide. The bipolar cell can include at least one ultraviolet light source operating as a virtual anode. The virtual anode can comprise an ultraviolet light source coated with an electrolytic coating. The water or aqueous solution can be in an aerated state upon leaving said injector assembly and entering said electrochemical cell. The control unit can regulate a pulse width and amplitude of a DC current generated by said variable power supply. The control unit can further comprise a pH controller configured to release any suitable agent from said source of at least one chemical precursor to regulate the pH level in said water or aqueous solution. The at least one sensor can comprise one or more sensors selected from the group consisting of a flow sensor mounted between said inlet and said injector assembly, a pH sensor operatively located at any desired point in the apparatus for monitoring said water or aqueous solution, and a water quality sensor located in said reservoir. The at least one sensor may be selected from the group consisting of: a total dissolved solids sensor, an oxidation-reduction potential sensor, a pH sensor, a UV-visible to near-infrared sensor, and a far-infrared sensor. The electrochemical cell, said injector assembly, and said source of chemical precursors can be integrated into a housing. The precursors can be selected from the group consisting of: air, oxygen, hydrogen peroxide, salts of bromide, iodide or chloride, ammonia, amines, peroxy-carbonates, peroxy-sulfates, and ozone. The precursors can also be gases selected from the group of of: air, ozone, oxygen, argon, methane, ammonia, nitrogen, carbon dioxide, chlorine, and hydrogen sulfide. The present invention may also utilize a gravity feed arrangement to feed precursors into said water or aqueous solution, and may also utilize a static discharge device for the precursors that discharges a predetermined amount of precursor based on the rate of flow of the water or aqueous solution.

One embodiment of the method of the present invention can comprise treating a flow of water or aqueous solution in water treatment applications, said method comprising the steps of: (a) providing at least one electrochemical cell; (b) treating said flow of water or aqueous solution by passing said flow through at least one electrochemical cell and subjecting said flow to an electrolytic process in said at least one electrochemical cell to create a desired customized water chemistry in said flow; (c) generating an oxidation or reduction or precipitation process in said electrochemical cell for treating said flow, said step of generating including operating a cathode and an anode in said electrochemical cell; (d) providing precursor materials that can be selectively injected into said flow; and (e) injecting said precursor materials into said flow prior to said step of treating to adjust said properties of said flow according to said desired customized water chemistry. The method may also include the step of monitoring properties of said flow with at least one sensor located upstream of said electrochemical cell and at least one sensor located downstream of said electrochemical cell. The method may also include the step of sending inputs from said at least one sensor to a control unit. The method may also include the step of controlling said steps of treating, generating, and injecting with said control unit configured to immediately react to said step of monitoring relative to said desired customized water chemistry and relative to fluctuations in said properties of said flow. The method may also include said step of controlling being manually directed. The method may also include said step of controlling comprising automatically reacting in real-time to said inputs by regulating the injection of said precursor materials. The method may also include said step of controlling being performed with a microprocessor adapted to receive and respond to said inputs. The method may also include wherein said anode is a dimensionally stable anode having a coating selected from the group of materials consisting of: boron-doped diamond, iridium oxide, titanium sub-oxide, doped aluminum oxide, doped silicon oxide, platinum metal, or a silica or tantalum carbide. The method may also include the step of disinfecting said flow via use of an ultraviolet light as said anode. The method may also include the step of arranging said at least one electrochemical cell in series. The method may also include the step of arranging said at least one electrochemical cell in parallel. The method may also include using ultrasound for a purpose selected from the following group consisting of: improving the rate of reaction in said step of generating, cleaning precipitated hardness from said cathode, degassing said flow, and increasing hydroxyl generation in said electrochemical cell. The method may also include said ultrasound being operated in a range from at or near 12 kHz to 70 kHz for said purposes of improving and cleaning and degassing, and in a range from at or near 0.1 MHz to 1 MHz for said purpose of increasing. The method may also include cleaning said anode with a solid-state electrolytic system. The method may also include said step of cleaning comprising coating said anode with an electrolytic coating and passing a current through said coating to generate an acidic layer on said coating where said coating is in contact with said flow. The method may also include said step of treating comprising removing arsenic, said step of generating further comprising placing an ion-exchange resin-impregnated membrane separating said flow between said anode and said cathode, and oxidizing arsenic III to arsenic IV. The method may also include said step of injecting comprising adding ammonia as a precursor reducing agent in said flow. The method may also include said step of controlling being configured to regulate said step of injecting such that said flow falls within desired pH ranges effective for leaching metals in solution mining applications. The method may also include said step of injecting further comprising adding at least one precursor selected from the group consisting of sulfide, carbonate, phosphate or sulfate ions to said flow to promote the precipitation of metals in said electrochemical cell for improving the leaching of metals in mine effluent. The method may also include the step of injecting said flow into boreholes in the ground for dissolution of metals in the ground after said steps of treating and generating. The method may also include said step of monitoring including the pH and concentration of said flow, and said step of injecting includes chemical compounds and air. The method may also include said step of injecting comprising reductants to create a reducing environment in said electrochemical cell for the treatment of contaminants not neutralized by an oxidation process. The method may also include said step of treating further comprising precipitating water hardness contributors at said cathode in said flow. The method may also include using a closed-loop ultrapure water circuit to continuously prevent materials from precipitating on said cathode and to increase the reaction rates in said generating step, wherein said flow at said cathode produces hydrogen peroxide for reinjection to said flow. The method may also include said step of controlling being configured to destroy organic contaminants in said flow. The method may also include said step of generating comprising providing said anode and said cathode in separated compartments and creating desired pH ranges in said compartments to separate precious metals from said flow. The method may also include said step of generating further comprising the use of an anionic or cationic membrane for generating higher pH concentrations in said compartments. The method may also include catalyzing oxidation or reduction reactions in said electrochemical cell by generating free radicals from organic or inorganic compounds in said flow by using an ultraviolet light source as an anode. The method may also include said step of injecting comprising increasing the pressure of said flow by super-saturating said flow with said precursor materials, said precursor materials being in gaseous form, wherein said flow is pressurized to a level in a range of at or near 10 to 200 psi greater than the operating pressure of said electrochemical cell, said level depending on the concentration required for the stoichiometry of said step of generating an oxidation or reduction or precipitation process in said electrochemical cell. Said step of treating may further comprise recirculating said flow through said electrochemical cell until said level is reached. Said step of treating may further comprise passing said flow through multiple electrochemical cells until said level is reached. Said precursors include gases selected from the group consisting of: air, ozone, oxygen, argon, methane, ammonia, nitrogen, carbon dioxide, chlorine, and hydrogen sulfide.

The present invention is also directed to an anode for use in an electrochemical cell, said anode comprising an ultraviolet light bulb and an automatic solid-state cleaning system. This aspect of the invention may also include said automatic solid-state cleaning system comprising an electrolytic coating. This aspect of the invention may also include said electrolytic coating being deposited on the surface of said bulb. This aspect of the invention may also include a quartz surface on said bulb with said electrolytic coating deposited on said quartz surface. This aspect of the invention may also include said quartz surface comprising a quartz sleeve adapted to slide over and be in contact with said bulb. This aspect of the invention may also include said electrolytic coating comprising a material selected from the group consisting of: boron-doped diamond, iridium oxide, titanium sub-oxide, doped aluminum oxide, doped silicon oxide, platinum metal, silica carbide, and tantalum carbide. This aspect of the invention may also include said electrolytic coating having a thickness in the range of at or near thirty to two hundred nanometers. The present invention is also directed to a method of cleaning an ultraviolet light anode comprising an automatic solid-state system. This aspect of the invention may also include said automatic solid-state system comprising passing a direct current through an electrolytic coating on said anode. This aspect of the invention may also include said step of passing a direct current comprising pulsing said direct current. This aspect of the invention may also include said pulsing of said direct current occurring in a range from at or near 400 Hz to 300 kHz. The power source uses automatic frequency modulation from 10 kHz to 300 kHz to hold the time averaged virtual anode current constant on the lamp or sleeve surface as aqueous solution conductivity changes or as precipitants build up on the return cathode surface between cleaning cycles. The direct current pulse voltage is used to control the maximum instantaneous current load on the surface to prevent premature coating failure or to meet the required minimum current loading in aqueous phase to kill pathogens. This aspect of the invention may also include said ultraviolet light anode emitting ultraviolet light in the range of at or near 172 to 260 nanometers. The present invention of a UV anode does not use an external connection to said electrolytic coating. Rather, an increased level of current comes from within said UV lamp and is passed through said electrolytic coating from said lamp. The electrodes in the lamp may be increased in size to handle the additional current for anode protection of the surface of the lamp. An additional ballast is used to supply the additional current to the lamp when the lamp supplies the current for the anode protection. The current return for the additional ballast comes through a submerged electrode in the treated water. The additional ballast output is controlled with a simple dimmer circuit.

The present invention is further directed to a method of cleaning an ultraviolet light anode in an electrochemical cell including an aqueous solution, said anode comprising an ultraviolet light bulb and an electrolytic coating, said method comprising the step of passing a direct current through said electrolytic coating sufficient to generate an anode charge on said coating, said direct current including an external connection to said electrolytic coating. This aspect of the invention may also include said step of passing a direct current comprising pulsing said direct current. This aspect of the invention may also include said pulsing of said direct current occurring in a range from at or near 400 Hz to 300 kHz. This aspect of the invention may also include ultraviolet light from said ultraviolet light anode being used to catalyze oxidation or reduction reactions in said electrochemical cell by generating free radicals from organic or inorganic compounds in said aqueous solution. This aspect of the invention may also include said ultraviolet light bulb emitting ultraviolet light in the range of at or near 172 to 260 nanometers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed. Any feature or combination of features described herein is included within the scope of the present invention provided that the features of any such combination are not mutually inconsistent.

What is claimed is:

1. A method of treating a flow of water or aqueous solution in water treatment applications, said flow having properties, said method comprising the steps of:
   (a) providing at least one electrochemical cell having at least one plate anode electrode and at least one plate cathode;
   (b) providing dual-band ultrasound for enhancement of an electro-chemical reaction in-between each pair of anode and cathode plate electrodes of said electrochemical cell operating as single emitters or in sweep mode, a first band of said ultrasound being in a range from about 12 kHz to about 70 kHz for keeping said electrodes clean, said first band of said ultrasound situated such that it is perpendicular to the pair of plate electrodes to allow a majority of the ultrasonic waves pass through the plates and a second band of said ultrasound in as range from about 0.1 MHz to about 1 MHz to generate free radicals said second band of said, ultrasound traveling through the plates and is parallel to a gap between the plates;
   (c) treating said flow of Water or aqueous solution by passing said flow through at least one electrochemical cell and subjecting said flow to an electrolytic process in said at least one electrochemical cell to create a customized water chemistry in said flow;
   (d) generating an oxidation and/or reduction and/or precipitation process in said electrochemical cell for treating said flow, said step of generating including operating at least one cathode and at least one anode in said electrochemical cell;
   (e) providing at least one precursor material that can be selectively injected into said flow; and
   (f) injecting at least one of said at least one precursor materials into said flow prior to said step of treating to adjust said properties of said flow according to said customized and optimized water chemistry for pH, oxidation reduction potential, total residual oxidants and total organic carbon.

2. The method of claim 1 further comprising the step of monitoring at least one property of said flow with at least one sensor located upstream of said electrochemical cell and at least one sensor located downstream of said electrochemical cell;
   wherein the monitoring is performed before and after completion of the water treating process of steps (a)-(f).

3. The method of claim 2 further comprising the steps of providing a microprocessor-based control unit and sending inputs from said at least one of said sensors to said control unit and said sensor being self-cleaning, wherein said sensors are positively charged optical sensors acting as a virtual anode.

4. The method of claim 3 further comprising the step of controlling said steps of treating, generating, and injecting said precursor(s) with said control unit, wherein said control unit controls the injection rate of the precursor material into the flow based on feedback values received from the one or more sensors positioned to received data before and after the treatment process.

5. The method of claim 3 wherein said optical sensors are coated with boron doped diamond or nitrogen doped diamond to keep a window portion of said sensors clean.

6. The method of claim 2 wherein monitoring of pH, oxidation reduction potential, total residual oxidants and total organic carbons are monitored before and after the process and monitoring of nephelometric turbidity unit is monitored downstream after the process.

7. The method of claim 1 wherein said step of injecting comprises providing at least one cartridge of at least one precursor material prepackaged in a predetermined volume and proportional to a dosing rate.

8. The method of claim 1 farther comprising the step of providing a dimensionally stable anode having a coating selected from the group of materials consisting of: boron-doped diamond, iridium oxide, titanium sub-oxide, doped aluminum oxide, doped silicon oxide, platinum metal, or a silica or tantalum carbide, or as said at least one ultraviolet light source operated as a virtual anode, said virtual anode comprising said at least one ultraviolet light source, an electrolytic coating, a modulated, high-frequency alternating current source, a modulated, high-frequency direct current source and an automatic solid-state cleaning system.

9. The method of claim 1 wherein said at least one electrochemical cell is a plurality of electrochemical cells and further comprising the step of arranging said plurality of electrochemical cells in series with each other.

10. The method of claim 9 wherein in a first of said plurality of electrochemical cells organics are oxidized to generate carbonate ion (CO3) and along with a precursor material in a second of said plurality electrochemical cells precipitation of inorganics salts occurs where carbonate ions are pulled out in the form of $CaCO_3$ on a cathode of the second electrochemical cell.

11. The method of claim 10 further comprising the step of heating a cathode plate of the second electrochemical cell.

12. The method of claim 10 further comprising the step of running the cathode of the second electrochemical cell at high current to maximize precipitation.

13. The method of claim 9 wherein ultrasonic transducers of a first of said plurality of electrochemical cells operates at about 0.1 MHz to about 1.0 MHz range for radicals generation for efficient oxidation of organics and at about 30 KHz to about 70 KHz range to enhance mixing of oxidants generated on the surfaces of the cathode and anode with organics present in the flow; wherein an ultrasonic transducer of a second of said plurality of electrochemical cells operate at or about 12 KHz and to about 16 KHz range for precipitation of inorganics and to keep the cathode plate clean.

14. The method of claim 1 further comprising the step of using, ultrasound in a range from about 12 kHz to 70 kHz and in a range from about 0.1 MHz to 1 MHz for at least one purpose selected from the following group consisting of: improving the rate of reaction in said step of generating, cleaning a precipitated material from said cathode, degassing said flow, heating said flow to increase electrochemical reaction rates, increasing surface diffusion at the electrode, increasing mixing of said flow, breaking intermolecular bonds in said flow, disinfecting said flow, controlling electrode surface temperature, increasing hydroxyl radical generation and increasing super radical generation in said electrochemical cell.

15. The method of claim 1 further comprising the step of cleaning said at least one ultraviolet light source with a solid-state electrolytic system.

16. The method of claim 1 further comprising the step of coating the at least one plate anode electrode and at least one plate cathode electrode with a dimensionally stable coating.

17. The method of claim 1 further comprising the step of catalyzing the chemical reaction.

18. The method of claim 17 wherein the step of catalyzing the chemical reaction comprises the step of shining at least one UV light on the anode and cathode surfaces or illuminating the anode and cathode surfaces.

19. The method of claim 1 wherein the treating the flow of water or aqueous solution steps further comprises the step of subjecting the flow with additional chemicals.

20. The method of claim 19 wherein the additional chemicals comprise one or more oxidants and one or more reducing agents.

21. The method of claim 20 wherein the oxidants comprises one or more from a group consisting of Ozone, Oxygen, $H_2O_2$ and $ClO_2$ and the reducing agents comprises one or more from a group consisting of: $CO_2$, $NH_3$ and CO.

22. The method of claim 1 wherein the precursor material comprises one or more from a group consisting of ammonia, $CaSO_4$ and $CaCO_3$ and is added to the flow to precipate scale causing minerals from the flow.

23. The method of claim 1 further comprising the step of adding seed crystals to the flow to enhance a precipitation reaction.

24. The method of claim 1 further comprising the step of installing a porous membrane between the anode and cathode to generate high and low pH stream of flow to maximize precipitation of minerals with the low pH flow produced on the anode surface and the high pH flow produced on the cathode surface.

25. The method of claim 1 wherein the at least one electrochemical cells capable operates using DC current or alternatively operates using pulsed DC current.

26. The method of claim 1 further comprising the step of vibrating the anode and cathode plates with ultrasonic vibration from ultrasonic transducers.

* * * * *